(12) United States Patent
Chen et al.

(10) Patent No.: US 10,120,820 B2
(45) Date of Patent: Nov. 6, 2018

(54) DIRECT MEMORY ACCESS TRANSMISSION CONTROL METHOD AND APPARATUS

(71) Applicant: Huawei Technologies Co., Ltd., Shenzhen (CN)

(72) Inventors: Hao Chen, Hangzhou (CN); Huifeng Xu, Shenzhen (CN); Haitao Guo, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/797,605

(22) Filed: Oct. 30, 2017

(65) Prior Publication Data

US 2018/0052789 A1 Feb. 22, 2018

Related U.S. Application Data

(63) Continuation of application No. PCT/CN2016/086758, filed on Jun. 22, 2016.

(30) Foreign Application Priority Data

Jun. 29, 2015 (CN) .......................... 2015 1 0372004

(51) Int. Cl.
*G06F 13/28* (2006.01)
*G06F 7/78* (2006.01)
(Continued)

(52) U.S. Cl.
CPC ................ *G06F 13/28* (2013.01); *G06F 7/74* (2013.01); *G06F 7/76* (2013.01); *G06F 7/78* (2013.01);
(Continued)

(58) Field of Classification Search
None
See application file for complete search history.

(56) References Cited

U.S. PATENT DOCUMENTS 4,901,234 A * 2/1990 Heath ..................... G06F 13/30
710/22
5,193,196 A * 3/1993 Mochida ................. G06F 13/30
710/241
(Continued)

FOREIGN PATENT DOCUMENTS

CN 101149717 A 3/2008
CN 103678199 A 3/2014
(Continued)

OTHER PUBLICATIONS

Machine Translation and Abstract of Chinese Publication No. CN104298628, Jan. 21, 2015, 11 pages.
(Continued)

*Primary Examiner* — Steven G Snyder
(74) *Attorney, Agent, or Firm* — Conley Rose, P.C.

(57) ABSTRACT

A direct memory access (DMA) transmission control method and apparatus, where the method includes selecting a target channel for the target DMA task according to a priority corresponding to the target DMA task when a DMA transmission request for transmitting data of a target DMA task is received, querying a task type and a priority of another DMA task that has occupied a channel and a task type of the target DMA task when the other DMA task exists on the DMA channel, comparing the task type and the priority of the other DMA task that has occupied the channel with the task type and the priority of the target DMA task, and controlling data transmission on the DMA channel according to a comparison result. Hence, the urgent DMA task can be preferentially processed.

20 Claims, 10 Drawing Sheets

(51) Int. Cl.
*G06F 9/50* (2006.01)
*G06F 13/18* (2006.01)
*G06F 7/76* (2006.01)
*G06F 7/74* (2006.01)
*G06F 13/30* (2006.01)

(52) U.S. Cl.
CPC ............ *G06F 9/5038* (2013.01); *G06F 13/18* (2013.01); *G06F 13/30* (2013.01); *G06F 2213/2802* (2013.01)

(56) References Cited

U.S. PATENT DOCUMENTS

| | | | | |
|---|---|---|---|---|
| 5,598,575 | A * | 1/1997 | Dent | G06F 13/18 710/28 |
| 5,983,301 | A * | 11/1999 | Baker | G06F 13/28 710/113 |
| 6,775,717 | B1 * | 8/2004 | Tang | G06F 13/28 710/113 |
| 7,143,205 | B2 * | 11/2006 | Sakugawa | G06F 13/30 710/22 |
| 7,620,745 | B2 * | 11/2009 | Kraus | H04L 12/5601 710/22 |
| 8,250,253 | B2 * | 8/2012 | Hor | G06F 13/30 710/116 |
| 8,516,163 | B2 * | 8/2013 | Wang | G06F 13/28 710/22 |
| 9,092,156 | B1 * | 7/2015 | Xu | G06F 3/0659 |
| 9,727,502 | B2 * | 8/2017 | Brewerton | G06F 13/28 |
| 2002/0194401 | A1 * | 12/2002 | Sakugawa | G06F 13/30 710/28 |
| 2006/0259663 | A1 * | 11/2006 | Castille | G06F 13/28 710/40 |
| 2007/0162642 | A1 * | 7/2007 | Tousek | G06F 13/1642 710/22 |
| 2007/0192515 | A1 * | 8/2007 | Kraus | H04L 12/5601 710/22 |
| 2008/0126600 | A1 * | 5/2008 | Mitchell | G06F 13/28 710/22 |
| 2011/0320645 | A1 * | 12/2011 | Hor | G06F 13/30 710/22 |
| 2014/0325114 | A1 | 10/2014 | Song | |
| 2015/0032914 | A1 * | 1/2015 | Brewerton | G06F 13/28 710/25 |
| 2015/0254197 | A1 | 9/2015 | Liao | |
| 2016/0350246 | A1 * | 12/2016 | Steedman | G06F 13/30 |

FOREIGN PATENT DOCUMENTS

| | | |
|---|---|---|
| CN | 103902467 A | 7/2014 |
| CN | 104123252 A | 10/2014 |
| CN | 104298628 A | 1/2015 |

OTHER PUBLICATIONS

Foreign Communication From a Counterpart Application, PCT Application No. PCT/CN2016/086758, English Translation of International Search Report dated Sep. 27, 2016, 2 pages.
Machine Translation and Abstract of Chinese Publication No. CN101149717, Mar. 26, 2008, 16 pages.
Machine Translation and Abstract of Chinese Publication No. CN103902467, Jul. 2, 2014, 31 pages.
Chen, K., "On the Design of Multi-Processor System-On-Chip for Media Processing,". Communication and Information System, Jun. 15, 2007, 2 page.
Foreign Communication From a Counterpart Application, Chinese Application No. 201510372004.7, Chinese Office Action dated Jul. 23, 2018, 5 pages.

* cited by examiner

DIRECT MEMORY ACCESS TRANSMISSION CONTROL METHOD AND APPARATUS

CROSS-REFERENCE TO RELATED APPLICATIONS

This application is a continuation of International Patent Application No. PCT/CN2016/086758 filed on Jun. 22, 2016, which claims priority to Chinese Patent Application No. 201510372004.7 filed on Jun. 29, 2015. The disclosures of the aforementioned applications are hereby incorporated by reference in their entireties.

TECHNICAL FIELD

The present disclosure relates to the field of computer technologies, and in particular, to a direct memory access (DMA) transmission control method and apparatus.

BACKGROUND

DMA is a fast data exchange mode. Direct data transmission between an external device and a memory can be completed in a DMA mode without using a central processing unit (CPU) and CPU intervention. In a DMA mode, the CPU only needs to deliver an instruction to a DMA transmission control apparatus in order to instruct the DMA transmission control apparatus to process data transmission. After completing data transmission, the DMA transmission control apparatus feeds back information that the transmission is ended to the CPU. In this way, a CPU resource occupancy rate is greatly reduced and system resources can be greatly saved. The DMA transmission control apparatus performs data transmission using a DMA channel. The DMA channel is provided with an input queue and an output queue, and both the input queue and the output queue include a series of parameter registers configured to record transmission parameters (such as size of to-be-transmitted data, a destination address, a source address, and a transmission progress), to-be-transmitted data, and the like of a target DMA task. For example, to transmit a data block of the external device to the memory, the DMA transmission control apparatus inputs a to-be-transmitted data block using the input queue of the DMA channel, and then outputs the data block to the external device using the output queue of the DMA channel in order to complete data transmission. The CPU may execute another task in a process in which the DMA transmission control apparatus performs data transmission. Therefore, processing efficiency of a computer system is improved.

However, an existing DMA transmission control apparatus is merely used as a hardware unit that is responsible for data transmission and executes DMA tasks according to an input time sequence of the tasks. In a transmission process in which DMA tasks with different priorities exist and even an urgent DMA task exists, a DMA task with a higher priority or the urgent DMA task cannot be processed until a DMA task whose sequence is prior to the DMA task with a higher priority or the urgent DMA task is processed. Therefore, a data transmission sequence cannot be adjusted according to actual importance degrees of tasks in a conventional DMA technology. As a result, processing efficiency and service quality of the computer system are reduced.

SUMMARY

Embodiments of the present disclosure provide a DMA transmission control method and apparatus in order to improve processing efficiency and service quality of a computer system.

A first aspect of the embodiments of the present disclosure provides a DMA transmission control method, including receiving a DMA transmission request, where the DMA transmission request carries a target DMA task, querying a priority of the target DMA task, and selecting, from a DMA channel according to the priority of the target DMA task, a DMA channel corresponding to the priority of the target DMA task as a target channel, determining whether a channel that has been occupied by another DMA task exists in the DMA channel, querying a task type of a DMA task that has occupied a channel and a task type of the target DMA task when a channel that has been occupied by another DMA task exists in the DMA channel, determining whether a DMA task whose task type is different from that of the target DMA task exists in the DMA task that has occupied the channel, querying a priority of the DMA task whose task type is different from that of the target DMA task when a DMA task whose task type is different from that of the target DMA task exists in the DMA task that has occupied the channel, determining whether a DMA task whose priority is lower than that of the target DMA task exists in the DMA task whose task type is different from that of the target DMA task, and suspending data transmission of the DMA task whose priority is lower than that of the target DMA task, obtaining target data of the target DMA task, inputting the target data using an input queue of the target channel, and outputting the target data using an output queue of an occupied channel corresponding to the DMA task whose priority is lower than that of the target DMA task when a DMA task whose priority is lower than that of the target DMA task exists in the DMA task whose task type is different from that of the target DMA task.

In a first possible implementation of the first aspect of the embodiments of the present disclosure, before receiving a DMA transmission request, where the DMA transmission request carries a target DMA task, the method further includes pre-storing a DMA task priority list and a mapping relationship table between a DMA task priority and a DMA channel, and querying a priority of the target DMA task, and selecting, from a DMA channel according to the priority of the target DMA task, a DMA channel corresponding to the priority of the target DMA task as a target channel includes querying the priority of the target DMA task in the DMA task priority list, querying, in the mapping relationship table between a DMA task priority and a DMA channel, the DMA channel corresponding to the priority of the target DMA task, and setting the DMA channel corresponding to the priority of the target DMA task as the target channel.

In a second possible implementation of the first aspect of the embodiments of the present disclosure, after determining whether a channel that has been occupied by another DMA task exists in the DMA channel, the method further includes obtaining the target data corresponding to the target DMA task, inputting the target data using the input queue of the target channel, and outputting the target data using an output queue of the target channel when no channel that has been occupied by another DMA task exists in the DMA channel.

In a third possible implementation of the first aspect of the embodiments of the present disclosure, after determining whether a DMA task whose task type is different from that of the target DMA task exists in the DMA task that has occupied the channel, the method further includes obtaining the target data corresponding to the target DMA task, inputting the target data using the input queue of the target channel, and outputting the target data using an output queue of the target channel when no DMA task whose task type is different from that of the target DMA task exists in the DMA task that has occupied the channel.

In a fourth possible implementation of the first aspect of the embodiments of the present disclosure, after determining whether a DMA task whose priority is lower than that of the target DMA task exists in the DMA task whose task type is different from that of the target DMA task, the method further includes obtaining the target data corresponding to the target DMA task, inputting the target data using the input queue of the target channel, and outputting the target data using an output queue of the target channel when no DMA task whose priority is lower than that of the target DMA task exists in the DMA task whose task type is different from that of the target DMA task.

A second aspect of the embodiments of the present disclosure provides a DMA transmission control method, including receiving a DMA transmission request, where the DMA transmission request carries a target DMA task, querying a priority of the target DMA task, and selecting, from a DMA channel according to the priority of the target DMA task, a DMA channel corresponding to the priority of the target DMA task as a target channel, determining whether a channel that has been occupied by another DMA task exists in the DMA channel, querying a priority of a DMA task that has occupied a channel when a channel that has been occupied by another DMA task exists in the DMA channel, determining whether a DMA task whose priority is lower than that of the target DMA task exists in the DMA task that has occupied the channel, and suspending data transmission of the DMA task whose priority is lower than that of the target DMA task, obtaining target data of the target DMA task, inputting the target data using an input queue of the target channel, and outputting the target data using an output queue of an occupied channel corresponding to the DMA task whose priority is lower than that of the target DMA task when a DMA task whose priority is lower than that of the target DMA task exists in the DMA task that has occupied the channel.

In a first possible implementation of the second aspect of the embodiments of the present disclosure, before receiving a DMA transmission request, where the DMA transmission request carries a target DMA task, the method further includes pre-storing a DMA task priority list and a mapping relationship table between a DMA task priority and a DMA channel, and querying a priority of the target DMA task, and selecting, from a DMA channel according to the priority of the target DMA task, a DMA channel corresponding to the priority of the target DMA task as a target channel includes querying the priority of the target DMA task in the DMA task priority list, querying, in the mapping relationship table between a DMA task priority and a DMA channel, the DMA channel corresponding to the priority of the target DMA task, and setting the DMA channel corresponding to the priority of the target DMA task as the target channel.

A third aspect of the embodiments of the present disclosure provides a DMA transmission control apparatus, including a receiving unit configured to receive a DMA transmission request, where the DMA transmission request carries a target DMA task, a first querying unit configured to query a priority of the target DMA task, and select, from a DMA channel according to the priority of the target DMA task, a DMA channel corresponding to the priority of the target DMA task as a target channel, a first determining unit configured to determine whether a channel that has been occupied by another DMA task exists in the DMA channel, a second querying unit configured to query a task type of a DMA task that has occupied a channel and a task type of the target DMA task when a channel that has been occupied by another DMA task exists in the DMA channel, a second determining unit configured to determine whether a DMA task whose task type is different from that of the target DMA task exists in the DMA task that has occupied the channel, a third querying unit configured to query a priority of the DMA task whose task type is different from that of the target DMA task when a DMA task whose task type is different from that of the target DMA task exists in the DMA task that has occupied the channel, a third determining unit configured to determine whether a DMA task whose priority is lower than that of the target DMA task exists in the DMA task whose task type is different from that of the target DMA task, a suspending unit configured to suspend data transmission of the DMA task whose priority is lower than that of the target DMA task when a DMA task whose priority is lower than that of the target DMA task exists in the DMA task whose task type is different from that of the target DMA task, and a first transmission unit configured to obtain target data of the target DMA task, input the target data using an input queue of the target channel, and output the target data using an output queue of an occupied channel corresponding to the DMA task whose priority is lower than that of the target DMA task.

In a first possible implementation of the third aspect of the embodiments of the present disclosure, the apparatus further includes a pre-storage unit configured to pre-store a DMA task priority list and a mapping relationship table between a DMA task priority and a DMA channel, and the first querying unit is further configured to query the priority of the target DMA task in the DMA task priority list, query, in the mapping relationship table between a DMA task priority and a DMA channel, the DMA channel corresponding to the priority of the target DMA task, and use the DMA channel corresponding to the priority of the target DMA task as the target channel.

In a second possible implementation of the third aspect of the embodiments of the present disclosure, the apparatus further includes a second transmission unit configured to obtain the target data corresponding to the target DMA task, input the target data using the input queue of the target channel, and output the target data using an output queue of the target channel when no channel that has been occupied by another DMA task exists in the DMA channel.

In a third possible implementation of the third aspect of the embodiments of the present disclosure, the apparatus further includes a third transmission unit configured to obtain the target data corresponding to the target DMA task, input the target data using the input queue of the target channel, and output the target data using an output queue of the target channel when no DMA task whose task type is different from that of the target DMA task exists in the DMA task that has occupied the channel.

In a fourth possible implementation of the third aspect of the embodiments of the present disclosure, the apparatus further includes a fourth transmission unit configured to obtain the target data corresponding to the target DMA task, input the target data using the input queue of the target channel, and output the target data using an output queue of the target channel when no DMA task whose priority is lower than that of the target DMA task exists in the DMA task whose task type is different from that of the target DMA task.

A fourth aspect of the embodiments of the present disclosure provides a DMA transmission control apparatus, including a receiving unit configured to receive a DMA transmission request, where the DMA transmission request carries a target DMA task, a first querying unit configured to query a priority of the target DMA task, and select, from a DMA channel according to the priority of the target DMA task, a DMA channel corresponding to the priority of the target DMA task as a target channel, a first determining unit configured to determine whether a channel that has been occupied by another DMA task exists in the DMA channel, a second querying unit configured to query a priority of a DMA task that has occupied a channel when a channel that has been occupied by another DMA task exists in the DMA channel, a second determining unit configured to determine whether a DMA task whose priority is lower than that of the target DMA task exists in the DMA task that has occupied the channel, a suspending unit configured to suspend data transmission of the DMA task whose priority is lower than that of the target DMA task when a DMA task whose priority is lower than that of the target DMA task exists in the DMA task that has occupied the channel, and a transmission unit configured to obtain target data of the target DMA task, input the target data using an input queue of the target channel, and output the target data using an output queue of an occupied channel corresponding to the DMA task whose priority is lower than that of the target DMA task.

In a first possible implementation of the fourth aspect of the embodiments of the present disclosure, the apparatus further includes a pre-storage unit configured to pre-store a DMA task priority list and a mapping relationship table between a DMA task priority and a DMA channel, and the first querying unit is further configured to query the priority of the target DMA task in the DMA task priority list, query, in the mapping relationship table between a DMA task priority and a DMA channel, the DMA channel corresponding to the priority of the target DMA task, and set the DMA channel corresponding to the priority of the target DMA task as the target channel.

In the embodiments of the present disclosure, when a DMA transmission request for transmitting data of a target DMA task is received, a target channel is selected for the target DMA task according to a priority corresponding to the target DMA task, if another DMA task exists on a DMA channel, a task type and a priority of the other DMA task that has occupied the channel and a task type of the target DMA task are queried. The task type and the priority of the other DMA task that has occupied the channel are compared with the task type and the priority of the target DMA task, and data transmission on the DMA channel is controlled according to a comparison result. In this way, data transmission can be properly planned according to a priority and a task type of a DMA task, and even if there is an urgent DMA task, the urgent DMA task can be preferentially processed, thereby improving processing efficiency and service quality of a computer system.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 1:
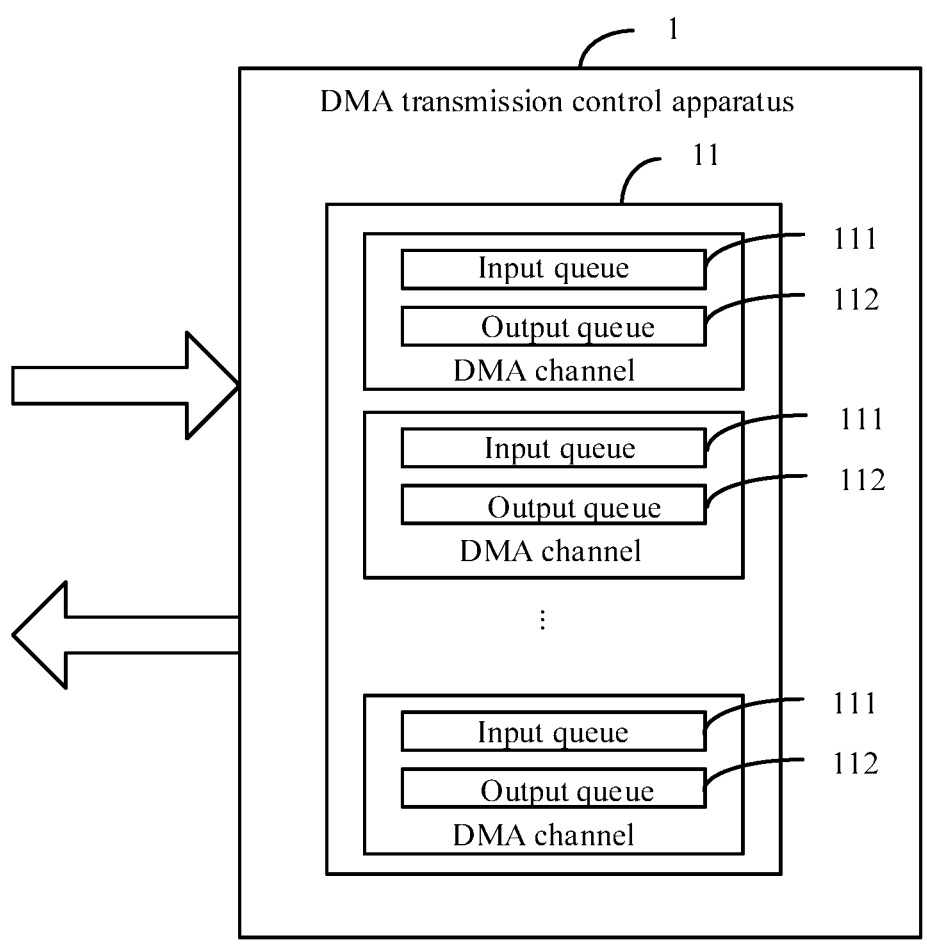
FIG. 1 is a structural diagram of a DMA transmission control apparatus according to an embodiment of the present disclosure.

Referring to FIG. 1, FIG. 1 is a structural diagram of a DMA transmission control apparatus 1 according to an embodiment of the present disclosure. As shown in FIG. 1, the DMA transmission control apparatus 1 in this embodiment includes a DMA channel 11. The DMA channel 11 includes at least one DMA channel used for data transmission, and each DMA channel includes an input queue 111 and an output queue 112. Both the input queue 111 and the output queue 112 include a series of parameter registers configured to record transmission parameters (such as an amount of to-be-transmitted data, a destination address, a source address, and a transmission progress), to-be-transmitted data, and the like of a target DMA task. In a feasible solution, a specific data transmission process is as follows. The DMA transmission control apparatus 1 receives a DMA transmission request, where the DMA transmission request carries a target DMA task, and the DMA transmission control apparatus 1 queries a priority of the target DMA task, selects, from the DMA channel 11 according to the priority of the target DMA task, a DMA channel corresponding to the priority of the target DMA task as a target channel, obtains target data of the target DMA task, inputs the target data using an input queue of the target channel, and outputs the target data using an output queue of the target channel in order to complete data transmission corresponding to the DMA transmission request.

With reference to FIG. 2 to FIG. 5, the following describes in detail a DMA transmission control method provided in the embodiments of the present disclosure.

Figure 2:
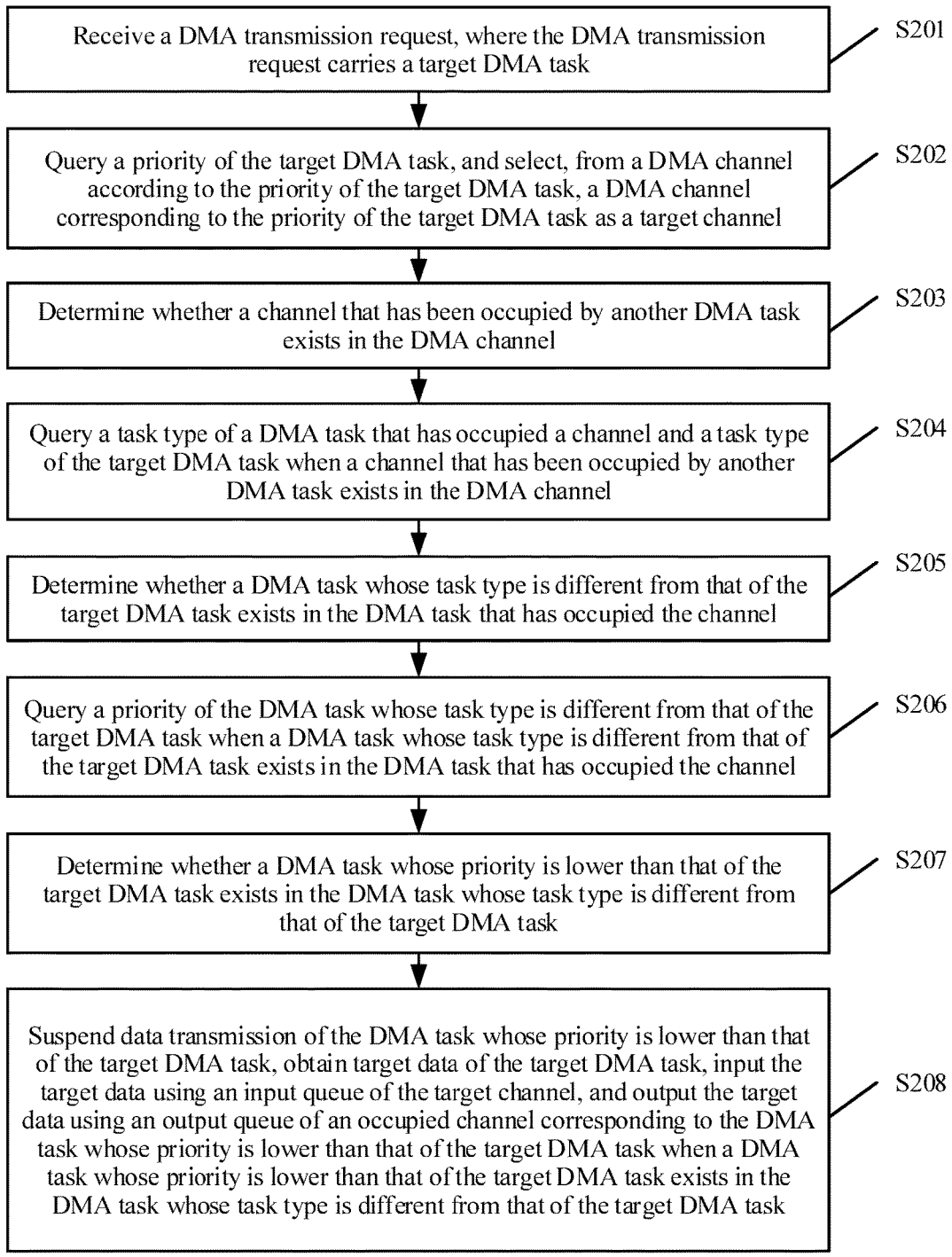
FIG. 2 is a schematic flowchart of a DMA transmission control method according to an embodiment of the present disclosure.

Referring to FIG. 2, FIG. 2 is a schematic flowchart of a DMA transmission control method according to an embodiment of the present disclosure. As shown in FIG. 2, the method in this embodiment of the present disclosure may include the following steps S201 to S208.

Step S201: Receive a DMA transmission request, where the DMA transmission request carries a target DMA task.

Further, a DMA transmission control apparatus receives the DMA transmission request, and obtains the target DMA task from the DMA transmission request, where the DMA transmission request carries the target DMA task. It can be understood that, if an external device expects to directly transmit data to a memory using a bus, the external device first sends a DMA transmission request signal to a CPU using the DMA transmission control apparatus, that is, the DMA transmission control apparatus sends a bus control right takeover request to the CPU. When receiving the request and responding to the DMA transmission request, the CPU hands over a bus control right. In this case, the DMA transmission control apparatus may process the DMA transmission request to obtain the target DMA task carried in the DMA transmission request in order to perform data transmission.

Step S202: Query a priority of the target DMA task, and select, from a DMA channel according to the priority of the target DMA task, a DMA channel corresponding to the priority of the target DMA task as a target channel.

The DMA transmission control apparatus queries the priority of the target DMA task, and selects, from the DMA channel according to the priority of the target DMA task, the DMA channel corresponding to the priority of the target DMA task as the target channel. The DMA transmission control apparatus may preset different priorities for different DMA tasks of different applications. In an optional solution, a lower priority is set for a DMA task with a larger amount of to-be-transmitted data, and a higher priority is set for a DMA task with a smaller amount of to-be-transmitted data. In this way, the DMA task with a smaller amount of to-be-transmitted data can be completed in a timely manner, thereby improving processing efficiency of a computer system. In addition, the DMA transmission control apparatus selects, from the DMA channel according to the priority of the target DMA task, the DMA channel corresponding to the priority of the target DMA task as the target channel in order to perform data transmission on the target DMA task using the target channel.

Step S203: Determine whether a channel that has been occupied by another DMA task exists in the DMA channel.

Further, the DMA transmission control apparatus determines whether a channel that has been occupied by another DMA task exists in the DMA channel. The DMA channel includes at least one DMA channel used for data transmission. The DMA transmission control apparatus determines whether there is a channel that has been occupied by another DMA task other than the target channel.

Step S204: Query a task type of a DMA task that has occupied a channel and a task type of the target DMA task when a channel that has been occupied by another DMA task exists in the DMA channel.

Further, when a channel that has been occupied by another DMA task exists in the DMA channel, the DMA transmission control apparatus queries the task type of the DMA task that has occupied the channel and the task type of the target DMA task. The task type may be classified into a bandwidth type task and a latency type task. The bandwidth type task emphasizes on an amount of data processed per unit time, and the latency type task emphasizes on a processing time spent per unit task. In a feasible solution, the task type may be classified into online transaction processing (OLTP) and online analytical processing (OLAP). The OLTP is characterized by a small task and a small query, and a parameter for measuring performance of an OLTP system is a response time of a single task, for example, online ticket booking in an online system. The OLAP is characterized by a large task and mainly includes multi-dimensional statistics collection and analysis performed on historical data, a processing time of a task is very long, and a parameter for measuring performance of an OLAP system is a total amount of data processed per unit time. The DMA transmission control apparatus has recorded task types of the different DMA tasks of the different applications, and may query a corresponding task type of a DMA task using records.

Step S205: Determine whether a DMA task whose task type is different from that of the target DMA task exists in the DMA task that has occupied the channel.

Further, the DMA transmission control apparatus determines, according to the queried task type of the DMA task that has occupied the channel and the queried task type of the target DMA task, whether a DMA task whose task type is different from that of the target DMA task exists in the DMA task that has occupied the channel.

Step S206: Query a priority of the DMA task whose task type is different from that of the target DMA task when a DMA task whose task type is different from that of the target DMA task exists in the DMA task that has occupied the channel.

Further, when a DMA task whose task type is different from that of the target DMA task exists in the DMA task that has occupied the channel, the DMA transmission control apparatus queries a priority of the DMA task whose task type is different from that of the target DMA task. The DMA transmission control apparatus determines a preferential DMA task processing sequence according to a task type and a priority.

Step S207: Determine whether a DMA task whose priority is lower than that of the target DMA task exists in the DMA task whose task type is different from that of the target DMA task.

Further, the DMA transmission control apparatus determines whether a DMA task whose priority is lower than that of the target DMA task exists in the DMA task whose task type is different from that of the target DMA task.

Step S208: Suspend data transmission of the DMA task whose priority is lower than that of the target DMA task, obtain target data of the target DMA task, input the target data using an input queue of the target channel, and output the target data using an output queue of an occupied channel corresponding to the DMA task whose priority is lower than that of the target DMA task when a DMA task whose priority is lower than that of the target DMA task exists in the DMA task whose task type is different from that of the target DMA task.

Further, when a DMA task whose priority is lower than that of the target DMA task exists in the DMA task whose task type is different from that of the target DMA task, the DMA transmission control apparatus suspends data transmission of the DMA task whose priority is lower than that of the target DMA task. In a feasible solution, when the DMA task whose priority is lower than that of the target DMA task is divided into multiple small tasks, even though data of some small tasks in the DMA task whose priority is lower than that of the target DMA task has been outputted using the output queue at a current moment, there is still another small task whose data is not transmitted or has been inputted using an input queue of the occupied channel. In this case, processing of the other small task is suspended, and data transmission of the target DMA task is preferentially performed. The DMA transmission control apparatus obtains the target data of the target DMA task, inputs the target data using the input queue of the target channel, and outputs the target data using the output queue of the occupied channel corresponding to the DMA task whose priority is lower than that of the target DMA task. It can be understood that, after output of the data of the target DMA task is completed, an output signal indicating that data transmission corresponding to the target DMA task is completed is sent to the CPU such that the bus control right is returned to the CPU.

It should be noted that, the DMA transmission control method described in this embodiment of the present disclosure may be applied to a case in which the external device is connected to a DMA channel of the DMA transmission control apparatus, that is, the external device can receive the data only using an output queue of the DMA transmission channel if the external device receives data, or the external device can send the data only using an input queue of the DMA channel if the external device sends data. For example, the DMA transmission control method is applied to a case in which an external device A is connected to a DMA channel 1 and an external device B is also connected to the DMA channel 1. The external device A sends a transmission request of a DMA task 1, and the DMA task 1 is transmitting data of a memory to an external device. A target channel is allocated according to a priority of the DMA task 1 (the target channel is not limited to the DMA channel 1 because the data is transmitted from the memory to a DMA channel, and a channel for data input is not limited). A DMA task 2 corresponding to the external device B is being processed on the DMA channel 1. A task type of the DMA task 1 is different from a task type of the DMA task 2, and the priority of the DMA task 1 is higher than a priority of the DMA task 2. Because a same output queue is used for the DMA task 1 that needs to be preferentially processed, data transmission of the DMA task 2 is suspended, and data of the DMA task 1 is obtained. The data of the DMA task 1 is inputted using an input queue of the target channel, and the target data is outputted using the output queue of the DMA channel 1.

In this embodiment of the present disclosure, when a DMA transmission request for transmitting data of a target DMA task is received, a target channel is selected for the target DMA task according to a priority corresponding to the target DMA task. If another DMA task exists on a DMA channel, a task type and a priority of the other DMA task that has occupied the channel and a task type of the target DMA task are queried. The task type and the priority of the other DMA task that has occupied the channel are compared with the task type and the priority of the target DMA task, and data transmission on the DMA channel is controlled according to a comparison result. In this way, data transmission can be properly planned according to a priority and a task type of a DMA task, and even if there is an urgent DMA task, the urgent DMA task can be preferentially processed, thereby improving processing efficiency and service quality of a computer system.

Figure 3A:
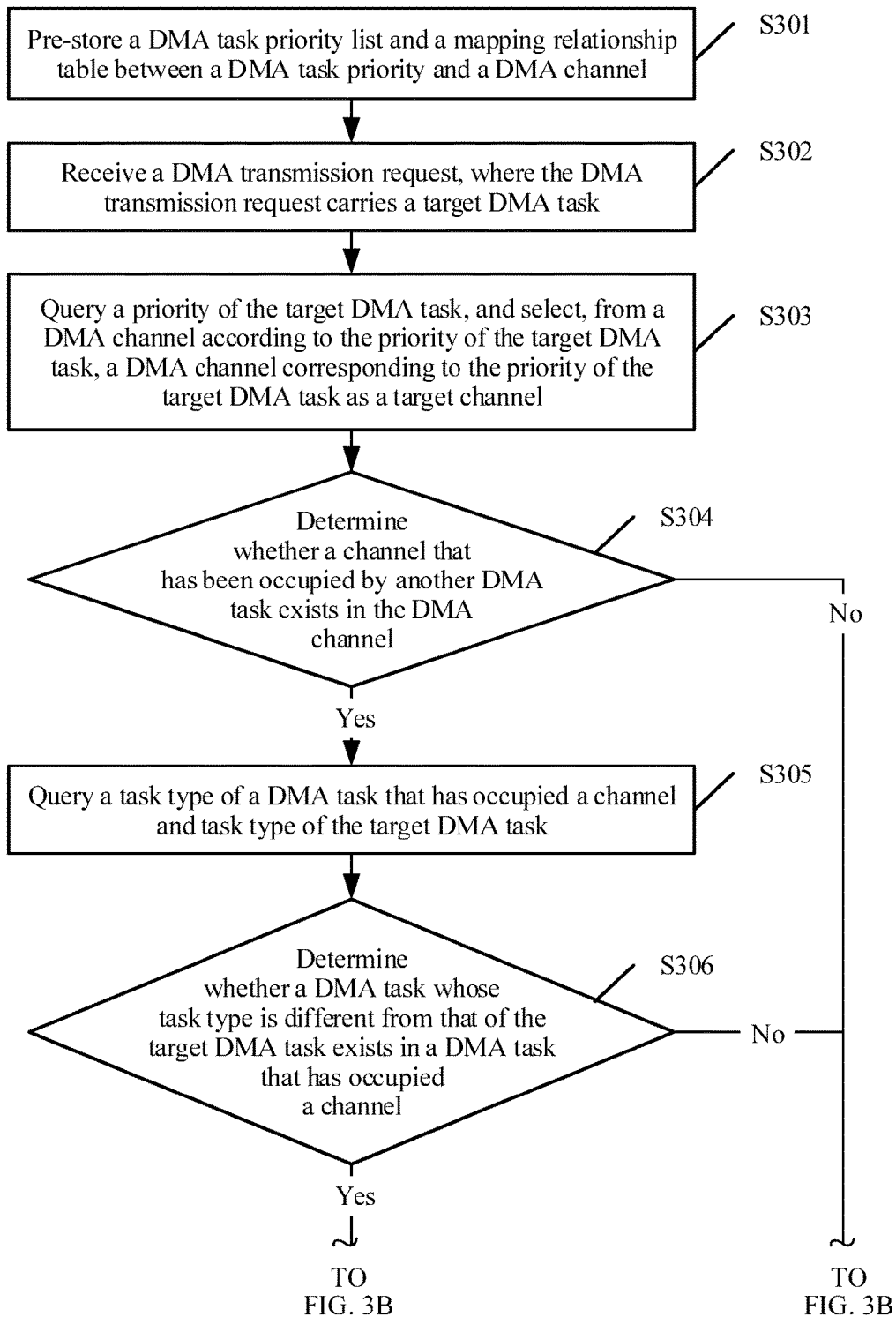
FIG. 3A and FIG. 3B are a schematic flowchart of another DMA transmission control method according to an embodiment of the present disclosure.
Figure 3B:
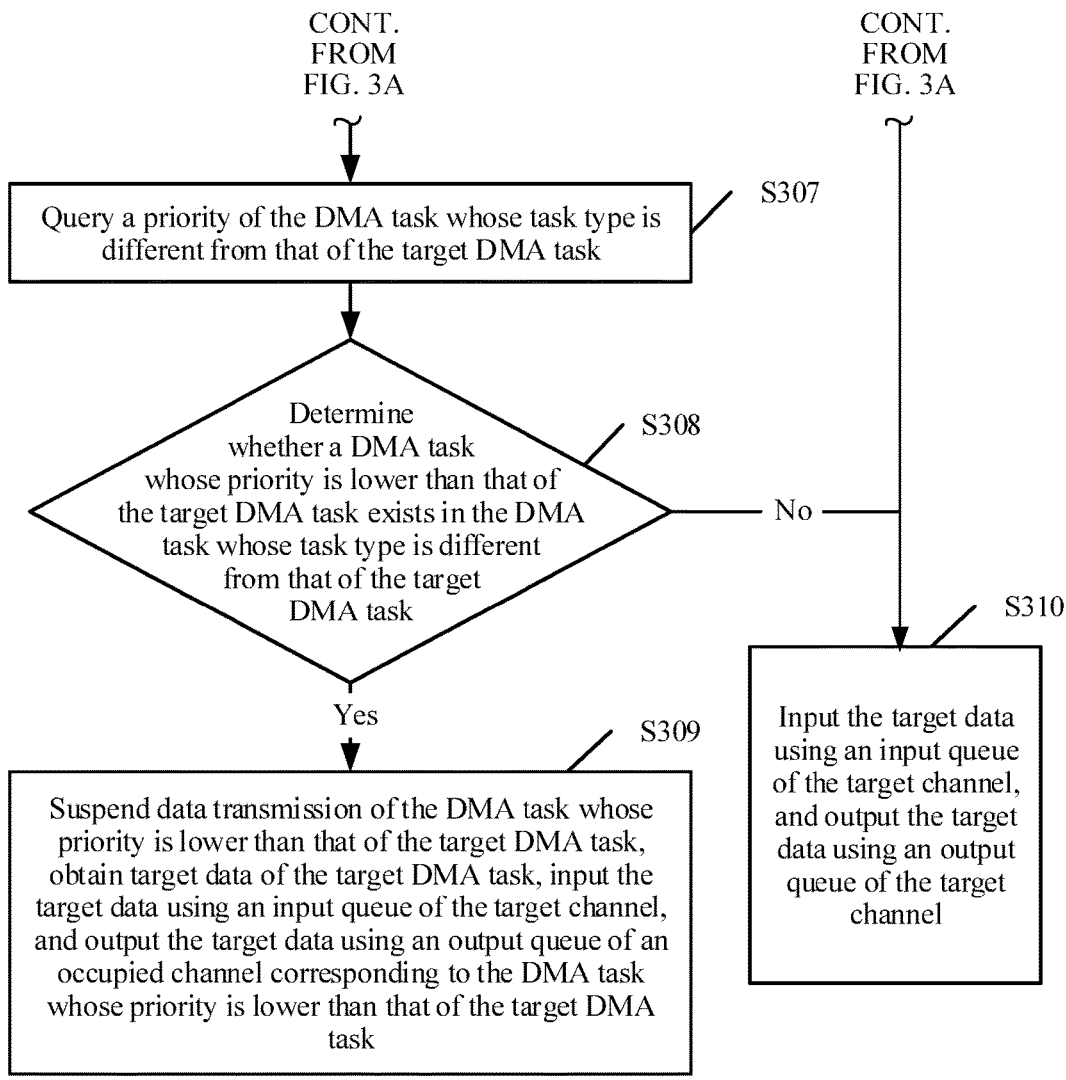

Referring to FIG. 3A and FIG. 3B, FIG. 3A and FIG. 3B are a schematic flowchart of a DMA transmission control method according to an embodiment of the present disclosure. As shown in FIG. 3A and FIG. 3B, the method in this embodiment of the present disclosure may include the following steps S301 to S310.

Step S301: Pre-store a DMA task priority list and a mapping relationship table between a DMA task priority and a DMA channel.

A DMA transmission control apparatus pre-stores the DMA task priority list and the mapping relationship table between a DMA task priority and a DMA channel. The DMA transmission control apparatus sets different priorities for different DMA tasks and sets different priorities for different DMA channels, and may change a DMA task priority and a DMA channel priority. The DMA channel includes at least one channel used for data transmission. In an optional solution, the DMA transmission control apparatus sets a priority for each channel. A DMA task priority may be determined according to an amount of to-be-transmitted data. A higher priority is set for a smaller data amount, and a lower priority is set for a larger data amount. Different priorities are determined according to data amounts, and a correspondence between a priority corresponding to a data amount and a priority that is set for a DMA channel is determined. The DMA task priority list and the mapping relationship table between a DMA task priority and a DMA channel are stored.

Step S302: Receive a DMA transmission request, where the DMA transmission request carries a target DMA task.

Further, the DMA transmission control apparatus receives the DMA transmission request, and obtains the target DMA task from the DMA transmission request, where the DMA transmission request carries the target DMA task. It can be understood that, if an external device expects to directly transmit data to a memory using a bus, the external device first sends a DMA transmission request signal to a CPU using the DMA transmission control apparatus, that is, the DMA transmission control apparatus sends a bus control right takeover request to the CPU. When receiving the request and responding to the DMA transmission request, the CPU hands over a bus control right. In this case, the DMA transmission control apparatus may process the DMA transmission request to obtain the target DMA task carried in the DMA transmission request in order to perform data transmission.

Step S303: Query a priority of the target DMA task, and select, from a DMA channel according to the priority of the target DMA task, a DMA channel corresponding to the priority of the target DMA task as a target channel.

Further, the DMA transmission control apparatus queries the priority of the target DMA task in the DMA task priority list, queries, in the mapping relationship table between a DMA task priority and a DMA channel, the DMA channel corresponding to the priority of the target DMA task, and uses the DMA channel corresponding to the priority of the target DMA task as the target channel.

Step S304: Determine whether a channel that has been occupied by another DMA task exists in the DMA channel.

Further, the DMA transmission control apparatus determines whether a channel that has been occupied by another DMA task exists in the DMA channel. The DMA channel includes at least one DMA channel used for data transmission. The DMA transmission control apparatus determines whether there is a channel that has been occupied by another DMA task other than the target channel. If a channel that has been occupied by another DMA task exists in the DMA channel, step S305 is performed, or if no channel that has been occupied by another DMA task exists in the DMA channel, step S310 is performed.

Step S305: Query a task type of a DMA task that has occupied a channel and a task type of the target DMA task.

Further, when a channel that has been occupied by another DMA task exists in the DMA channel, the DMA transmission control apparatus queries the task type of the DMA task that has occupied the channel and the task type of the target DMA task. The task type may be classified into a bandwidth type task and a latency type task. The bandwidth type task emphasizes on an amount of data processed per unit time, and the latency type task emphasizes on a processing time spent per unit task. In a feasible solution, the task type may be classified into OLTP and OLAP. The OLTP is characterized by a small task and a small query, and a parameter for measuring performance of an OLTP system is a response time of a single task, for example, online ticket booking in an online system. The OLAP is characterized by a large task and mainly includes multi-dimensional statistics collection and analysis performed on historical data, a processing time of a task is very long, and a parameter for measuring performance of an OLAP system is a total amount of data processed per unit time. The DMA transmission control apparatus has recorded task types of different DMA tasks of different applications, and may query a corresponding task type of a DMA task using records.

Step S306: Determine whether a DMA task whose task type is different from that of the target DMA task exists in the DMA task that has occupied the channel.

Further, the DMA transmission control apparatus determines, according to the queried task type of the DMA task that has occupied the channel and the queried task type of the target DMA task, whether a DMA task whose task type is different from that of the target DMA task exists in the DMA task that has occupied the channel. If a DMA task whose task type is different from that of the target DMA task exists in the DMA task that has occupied the channel, step S307 is performed, or if no DMA task whose task type is different from that of the target DMA task exists in the DMA task that has occupied the channel, step S310 is performed.

Step S307: Query a priority of the DMA task whose task type is different from that of the target DMA task.

Further, when a DMA task whose task type is different from that of the target DMA task exists in the DMA task that has occupied the channel, the DMA transmission control apparatus queries a priority of the DMA task whose task type is different from that of the target DMA task. The DMA transmission control apparatus determines a preferential DMA task processing sequence according to a task type and a priority.

Step S308: Determine whether a DMA task whose priority is lower than that of the target DMA task exists in the DMA task whose task type is different from that of the target DMA task.

The DMA transmission control apparatus determines whether a DMA task whose priority is lower than that of the target DMA task exists in the DMA task whose task type is different from that of the target DMA task. If a DMA task whose priority is lower than that of the target DMA task exists in the DMA task whose task type is different from that of the target DMA task, step S309 is performed, or if no DMA task whose priority is lower than that of the target DMA task exists in the DMA task whose task type is different from that of the target DMA task, step S310 is performed.

Step S309: Suspend data transmission of the DMA task whose priority is lower than that of the target DMA task, obtain target data of the target DMA task, input the target data using an input queue of the target channel, and output the target data using an output queue of an occupied channel corresponding to the DMA task whose priority is lower than that of the target DMA task.

Further, when a DMA task whose priority is lower than that of the target DMA task exists in the DMA task whose task type is different from that of the target DMA task, the DMA transmission control apparatus suspends data transmission of the DMA task whose priority is lower than that of the target DMA task. In a feasible solution, when the DMA task whose priority is lower than that of the target DMA task is divided into multiple small tasks, even though data of some small tasks in the DMA task whose priority is lower than that of the target DMA task has been outputted using the output queue at a current moment, there is still another small task whose data is not transmitted or has been inputted using an input queue of the occupied channel. In this case, processing of the other small task is suspended, and data transmission of the target DMA task is preferentially performed. The DMA transmission control apparatus obtains the target data of the target DMA task, inputs the target data using the input queue of the target channel, and outputs the target data using the output queue of the occupied channel corresponding to the DMA task whose priority is lower than that of the target DMA task. It can be understood that, after output of the data of the target DMA task is completed, an output signal indicating that data transmission corresponding to the target DMA task is completed is sent to the CPU such that the bus control right is returned to the CPU.

It should be noted that, the DMA transmission control method described in this embodiment of the present disclosure may be applied to a case in which the external device is connected to a DMA channel of the DMA transmission control apparatus, that is, the external device can receive the data only using an output queue of the DMA transmission channel if the external device receives data, or the external device can send the data only using an input queue of the DMA channel if the external device sends data. For example, the DMA transmission control method is applied to a case in which an external device A is connected to a DMA channel 1 and an external device B is also connected to the DMA channel 1. The external device A sends a transmission request of a DMA task 1, and the DMA task 1 is transmitting data of a memory to an external device. A target channel is allocated according to a priority of the DMA task 1 (the target channel is not limited to the DMA channel 1 because the data is transmitted from the memory to a DMA channel, and a channel for data input is not limited). A DMA task 2 corresponding to the external device B is being processed on the DMA channel 1. A task type of the DMA task 1 is different from a task type of the DMA task 2, and the priority of the DMA task 1 is higher than a priority of the DMA task 2. Because a same output queue is used for the DMA task 1 that needs to be preferentially processed, data transmission of the DMA task 2 is suspended, and data of the DMA task 1 is obtained. The data of the DMA task 1 is inputted using an input queue of the target channel, and the target data is outputted using the output queue of the DMA channel 1.

Step S310: Input the target data using an input queue of the target channel, and output the target data using an output queue of the target channel.

The DMA transmission control apparatus inputs the target data using the input queue of the target channel, and outputs the target data using the output queue of the target channel. In a feasible solution, when no channel that has been occupied by another DMA task exists in the DMA channel, the DMA transmission control apparatus obtains target data corresponding to the target DMA task, inputs the target data using an input queue of the target channel, and outputs the target data using an output queue of the target channel. In another feasible solution, when no DMA task whose task type is different from that of the target DMA task exists in the DMA task that has occupied the channel, the DMA transmission control apparatus obtains target data corresponding to the target DMA task, inputs the target data using an input queue of the target channel, and outputs the target data using an output queue of the target channel. In still another feasible solution, when no DMA task whose priority is lower than that of the target DMA task exists in the DMA task whose task type is different from that of the target DMA task, the DMA transmission control apparatus obtains target data corresponding to the target DMA task, inputs the target data using an input queue of the target channel, and outputs the target data using an output queue of the target channel.

In this embodiment of the present disclosure, when a DMA transmission request for transmitting data of a target DMA task is received, a target channel is selected for the target DMA task according to a priority corresponding to the target DMA task. If another DMA task exists on a DMA channel, a task type and a priority of the other DMA task that has occupied the channel and a task type of the target DMA task are queried. The task type and the priority of the other DMA task that has occupied the channel are compared with the task type and the priority of the target DMA task, and data transmission on the DMA channel is controlled according to a comparison result. In this way, data transmission can be properly planned according to a priority and a task type of a DMA task, and even if there is an urgent DMA task, the urgent DMA task can be preferentially processed, thereby improving processing efficiency and service quality of a computer system.

Figure 4:
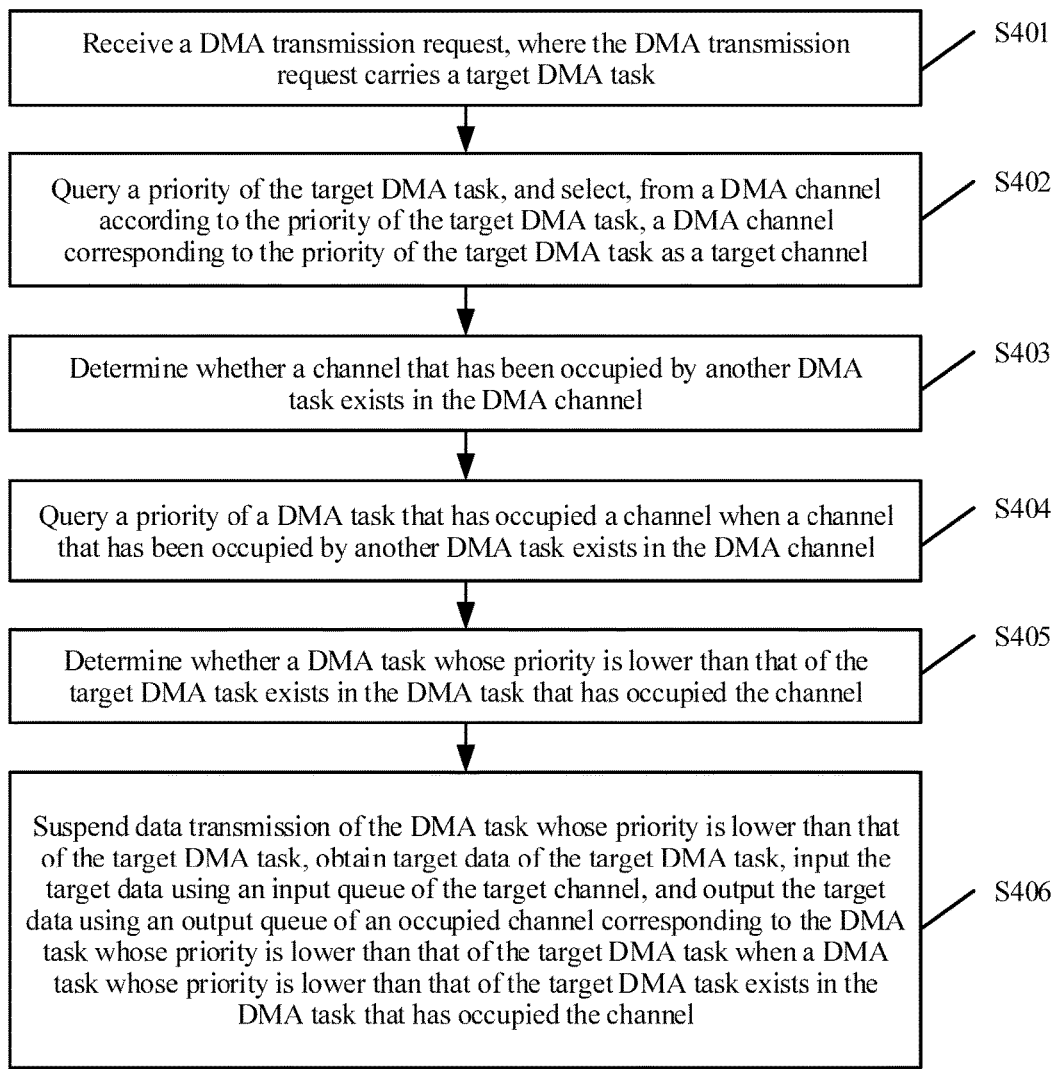
FIG. 4 is a schematic flowchart of still another DMA transmission control method according to an embodiment of the present disclosure.

Referring to FIG. 4, FIG. 4 is a schematic flowchart of a DMA transmission control method according to an embodiment of the present disclosure. As shown in FIG. 4, the method in this embodiment of the present disclosure may include the following steps S401 to S406.

Step S401: Receive a DMA transmission request, where the DMA transmission request carries a target DMA task.

A DMA transmission control apparatus receives the DMA transmission request, and obtains the target DMA task from the DMA transmission request, where the DMA transmission request carries the target DMA task. It can be understood that, if an external device expects to directly transmit data to a memory using a bus, the external device first sends a DMA transmission request signal to a CPU using the DMA transmission control apparatus, that is, the DMA transmission control apparatus sends a bus control right takeover request to the CPU. The CPU hands over a bus control right when receiving the request and responding to the DMA transmission request. In this case, the DMA transmission control apparatus may process the DMA transmission request to obtain the target DMA task carried in the DMA transmission request in order to perform data transmission.

Step S402: Query a priority of the target DMA task, and select, from a DMA channel according to the priority of the target DMA task, a DMA channel corresponding to the priority of the target DMA task as a target channel.

The DMA transmission control apparatus queries the priority of the target DMA task, and selects, from the DMA channel according to the priority of the target DMA task, the DMA channel corresponding to the priority of the target DMA task as the target channel. The DMA transmission control apparatus may preset different priorities for different DMA tasks of different applications. In an optional solution, a lower priority is set for a DMA task with a larger amount of to-be-transmitted data, and a higher priority is set for a DMA task with a smaller amount of to-be-transmitted data. In this way, the DMA task with a smaller amount of to-be-transmitted data can be completed in a timely manner, thereby improving processing efficiency of a computer system. In addition, the DMA transmission control apparatus selects, from the DMA channel according to the priority of the target DMA task, the DMA channel corresponding to the priority of the target DMA task as the target channel in order to perform data transmission on the target DMA task using the target channel.

Step S403: Determine whether a channel that has been occupied by another DMA task exists in the DMA channel.

Further, the DMA transmission control apparatus determines whether a channel that has been occupied by another DMA task exists in the DMA channel. The DMA channel includes at least one DMA channel used for data transmission. The DMA transmission control apparatus determines whether there is a channel that has been occupied by another DMA task other than the target channel.

Step S404: Query a priority of a DMA task that has occupied a channel when a channel that has been occupied by another DMA task exists in the DMA channel.

The DMA transmission control apparatus queries the priority of the DMA task that has occupied the channel when a channel that has been occupied by another DMA task exists in the DMA channel. The DMA transmission control apparatus determines a DMA task processing sequence according to a priority.

Step S405: Determine whether a DMA task whose priority is lower than that of the target DMA task exists in the DMA task that has occupied the channel.

Further, the DMA transmission control apparatus determines whether a DMA task whose priority is lower than that of the target DMA task exists in the DMA task that has occupied the channel.

Step S406: Suspend data transmission of the DMA task whose priority is lower than that of the target DMA task, obtain target data of the target DMA task, input the target data using an input queue of the target channel, and output the target data using an output queue of an occupied channel corresponding to the DMA task whose priority is lower than that of the target DMA task when a DMA task whose priority is lower than that of the target DMA task exists in the DMA task that has occupied the channel.

The DMA transmission control apparatus suspends data transmission of the DMA task whose priority is lower than that of the target DMA task when a DMA task whose priority is lower than that of the target DMA task exists in the DMA task that has occupied the channel. In a feasible solution, when the DMA task whose priority is lower than that of the target DMA task is divided into multiple small tasks, even though data of some small tasks in the DMA task whose priority is lower than that of the target DMA task has been outputted using the output queue at a current moment, there is still another small task whose data is not transmitted or has been inputted using an input queue of the occupied channel. In this case, processing of the other small task is suspended, and data transmission of the target DMA task is preferentially performed. The DMA transmission control apparatus obtains the target data of the target DMA task, inputs the target data using the input queue of the target channel, and outputs the target data using the output queue of the occupied channel corresponding to the DMA task whose priority is lower than that of the target DMA task. It can be understood that, after output of the data of the target DMA task is completed, an output signal indicating that data transmission corresponding to the target DMA task is completed is sent to the CPU such that the bus control right is returned to the CPU.

It should be noted that, the DMA transmission control method described in this embodiment of the present disclosure may be applied to a case in which the external device is connected to a DMA channel of the DMA transmission control apparatus, that is, the external device can receive the data only using an output queue of the DMA transmission channel if the external device receives data, or the external device can send the data only using an input queue of the DMA channel if the external device sends data. For example, the DMA transmission control method is applied to a case in which an external device A is connected to a DMA channel 1 and an external device B is also connected to the DMA channel 1. The external device A sends a transmission request of a DMA task 1, and the DMA task 1 is transmitting data of a memory to an external device. A target channel is allocated according to a priority of the DMA task 1 (the target channel is not limited to the DMA channel 1 because the data is transmitted from the memory to a DMA channel, and a channel for data input is not limited). A DMA task 2 corresponding to the external device B is being processed on the DMA channel 1, and the priority of the DMA task 1 is higher than a priority of the DMA task 2. Because a same output queue is used for the DMA task 1 that needs to be preferentially processed, data transmission of the DMA task 2 is suspended, and data of the DMA task 1 is obtained. The data of the DMA task 1 is inputted using an input queue of the target channel, and the target data is outputted using an output queue of the DMA channel 1.

In this embodiment of the present disclosure, when a DMA transmission request for transmitting data of a target DMA task is received, a target channel is selected for the target DMA task according to a priority corresponding to the target DMA task. If another DMA task exists on a DMA channel, a priority of the other DMA task that has occupied the channel is queried. The priority of the other DMA task that has occupied the channel is compared with the priority of the target DMA task, and data transmission on the DMA channel is controlled according to a comparison result. In this way, data transmission can be properly planned according to a priority of a DMA task, and even if there is an urgent DMA task, the urgent DMA task can be preferentially processed, thereby improving processing efficiency and service quality of a computer system.

Figure 5:
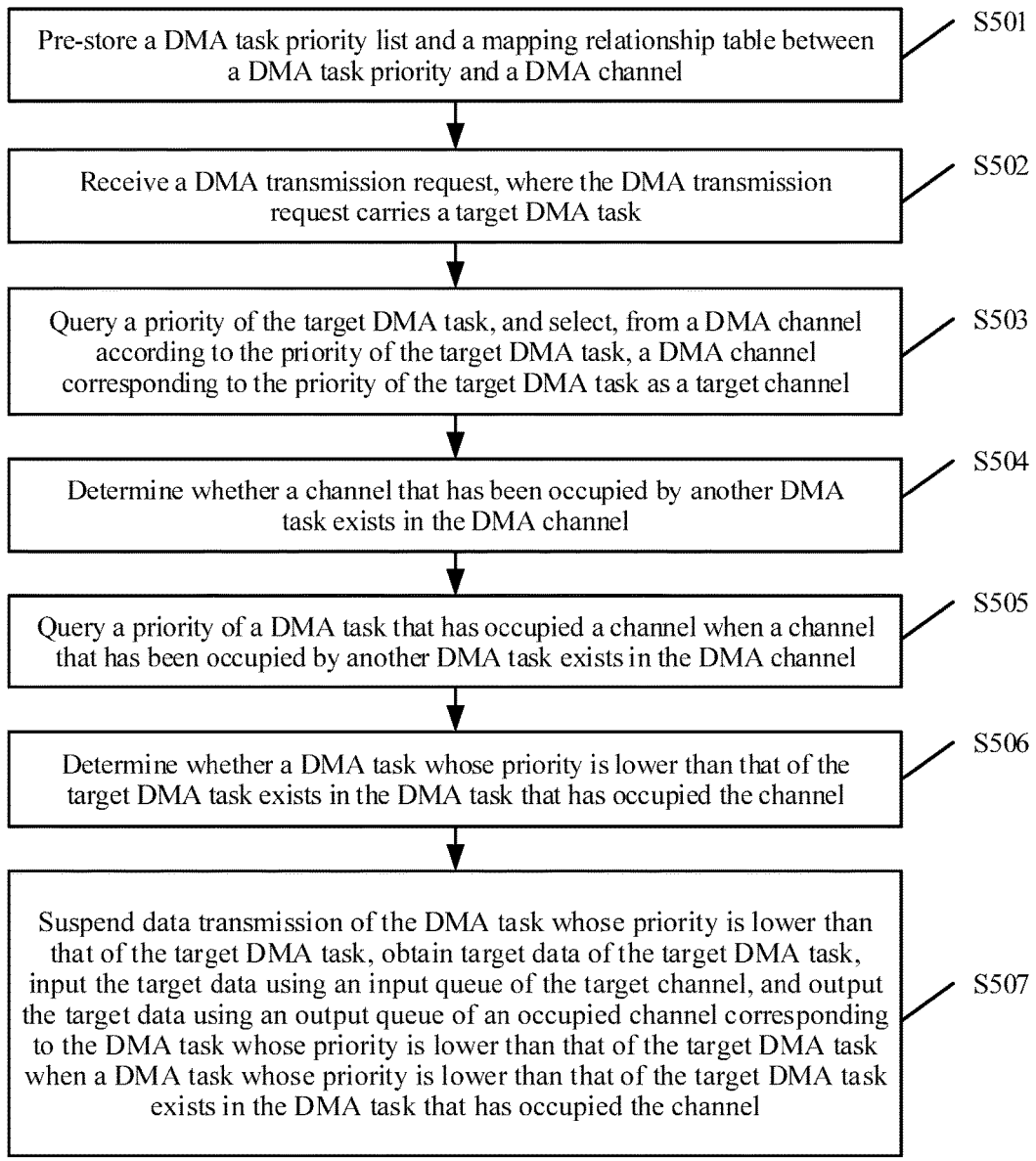
FIG. 5 is a schematic flowchart of still another DMA transmission control method according to an embodiment of the present disclosure.

Referring to FIG. 5, FIG. 5 is a schematic flowchart of a DMA transmission control method according to an embodiment of the present disclosure. As shown in FIG. 5, the method in this embodiment of the present disclosure may include the following steps S501 to S507.

Step S501: Pre-store a DMA task priority list and a mapping relationship table between a DMA task priority and a DMA channel.

Further, a DMA transmission control apparatus pre-stores the DMA task priority list and the mapping relationship table between a DMA task priority and a DMA channel. The DMA transmission control apparatus sets different priorities for different DMA tasks and sets different priorities for different DMA channels, and may change a DMA task priority and a DMA channel priority. The DMA channel includes at least one channel used for data transmission. In an optional solution, the DMA transmission control apparatus sets a priority for each channel. A DMA task priority may be determined according to an amount of to-be-transmitted data. A higher priority is set for a smaller data amount, and a lower priority is set for a larger data amount. Different priorities are determined according to data amounts, and a correspondence between a priority corresponding to a data amount and a priority that is set for a DMA channel is determined. The DMA task priority list and the mapping relationship table between a DMA task priority and a DMA channel are stored.

Step S502: Receive a DMA transmission request, where the DMA transmission request carries a target DMA task.

The DMA transmission control apparatus receives the DMA transmission request, and obtains the target DMA task from the DMA transmission request, where the DMA transmission request carries the target DMA task. It can be understood that, if an external device expects to directly transmit data to a memory using a bus, the external device first sends a DMA transmission request signal to a CPU using the DMA transmission control apparatus, that is, the DMA transmission control apparatus sends a bus control right takeover request to the CPU. When receiving the request and responding to the DMA transmission request, the CPU hands over a bus control right. In this case, the DMA transmission control apparatus may process the DMA transmission request to obtain the target DMA task carried in the DMA transmission request in order to perform data transmission.

Step S503: Query a priority of the target DMA task, and select, from a DMA channel according to the priority of the target DMA task, a DMA channel corresponding to the priority of the target DMA task as a target channel.

The DMA transmission control apparatus queries the priority of the target DMA task in the DMA task priority list, queries, in the mapping relationship table between a DMA task priority and a DMA channel, the DMA channel corresponding to the priority of the target DMA task, and uses the DMA channel corresponding to the priority of the target DMA task as the target channel.

Step S504: Determine whether a channel that has been occupied by another DMA task exists in the DMA channel.

The DMA transmission control apparatus determines whether a channel that has been occupied by another DMA task exists in the DMA channel. The DMA channel includes at least one DMA channel used for data transmission. The DMA transmission control apparatus determines whether there is a channel that has been occupied by another DMA task other than the target channel.

Step S505: Query a priority of a DMA task that has occupied a channel when a channel that has been occupied by another DMA task exists in the DMA channel.

Further, when a channel that has been occupied by another DMA task exists in the DMA channel, the DMA transmission control apparatus queries the priority of the DMA task that has occupied the channel. The DMA transmission control apparatus determines a DMA task processing sequence according to a priority.

Step S506: Determine whether a DMA task whose priority is lower than that of the target DMA task exists in the DMA task that has occupied the channel.

Further, the DMA transmission control apparatus determines whether a DMA task whose priority is lower than that of the target DMA task exists in the DMA task that has occupied the channel.

Step S507: Suspend data transmission of the DMA task whose priority is lower than that of the target DMA task, obtain target data of the target DMA task, input the target data using an input queue of the target channel, and output the target data using an output queue of an occupied channel corresponding to the DMA task whose priority is lower than that of the target DMA task when a DMA task whose priority is lower than that of the target DMA task exists in the DMA task that has occupied the channel.

Further, when a DMA task whose priority is lower than that of the target DMA task exists in the DMA task that has occupied the channel, the DMA transmission control apparatus suspends data transmission of the DMA task whose priority is lower than that of the target DMA task. In a feasible solution, when the DMA task whose priority is lower than that of the target DMA task is divided into multiple small tasks, even though data of some small tasks in the DMA task whose priority is lower than that of the target DMA task has been outputted using the output queue at a current moment, there is still another small task whose data is not transmitted or has been inputted using an input queue of the occupied channel. In this case, processing of the other small task is suspended, and data transmission of the target DMA task is preferentially performed. The DMA transmission control apparatus obtains the target data of the target DMA task, inputs the target data using the input queue of the target channel, and outputs the target data using the output queue of the occupied channel corresponding to the DMA task whose priority is lower than that of the target DMA task. It can be understood that, after output of the data of the target DMA task is completed, an output signal indicating that data transmission corresponding to the target DMA task is completed is sent to the CPU such that the bus control right is returned to the CPU.

Further, in a feasible solution, when no channel that has been occupied by another DMA task exists in the DMA channel, target data corresponding to the target DMA task is obtained, the target data is inputted using an input queue of the target channel, and the target data is outputted using an output queue of the target channel. In another feasible solution, when no DMA task whose priority is lower than that of the target DMA task exists in the DMA task that has occupied the channel, target data corresponding to the target DMA task is obtained, the target data is inputted using an input queue of the target channel, and the target data is outputted using an output queue of the target channel.

It should be noted that, the DMA transmission control method described in this embodiment of the present disclosure may be applied to a case in which the external device is connected to a DMA channel of the DMA transmission control apparatus, that is, the external device can receive the data only using an output queue of the DMA transmission channel if the external device receives data, or the external device can send the data only using an input queue of the DMA channel if the external device sends data. For example, the DMA transmission control method is applied to a case in which an external device A is connected to a DMA channel 1 and an external device B is also connected to the DMA channel 1. The external device A sends a transmission request of a DMA task 1, and the DMA task 1 is transmitting data of a memory to an external device. A target channel is allocated according to a priority of the DMA task 1 (the target channel is not limited to the DMA channel 1 because the data is transmitted from the memory to a DMA channel, and a channel for data input is not limited). A DMA task 2 corresponding to the external device B is being processed on the DMA channel 1, and the priority of the DMA task 1 is higher than a priority of the DMA task 2. Because a same output queue is used for the DMA task 1 that needs to be preferentially processed, data transmission of the DMA task 2 is suspended, and data of the DMA task 1 is obtained. The data of the DMA task 1 is inputted using an input queue of the target channel, and the target data is outputted using an output queue of the DMA channel 1.

In this embodiment of the present disclosure, when a DMA transmission request for transmitting data of a target DMA task is received, a target channel is selected for the target DMA task according to a priority corresponding to the target DMA task. If another DMA task exists on a DMA channel, a priority of the other DMA task that has occupied the channel is queried. The priority of the other DMA task that has occupied the channel is compared with the priority of the target DMA task, and data transmission on the DMA channel is controlled according to a comparison result. In this way, data transmission can be properly planned according to a priority of a DMA task, and even if there is an urgent DMA task, the urgent DMA task can be preferentially processed, thereby improving processing efficiency and service quality of a computer system.

With reference to FIG. 6 to FIG. 9, the following describes in detail a DMA transmission control apparatus provided in the embodiments of the present disclosure. It should be noted that, the DMA transmission control apparatus shown in FIG. 4 and FIG. 5 is configured to execute the method in the embodiments shown in FIG. 2 to FIG. 5 of the present disclosure. For ease of description, only a part related to this embodiment of the present disclosure is shown. For specific technical details that are not disclosed, refer to the embodiments shown in FIG. 2 to FIG. 5 of the present disclosure.

Figure 6:
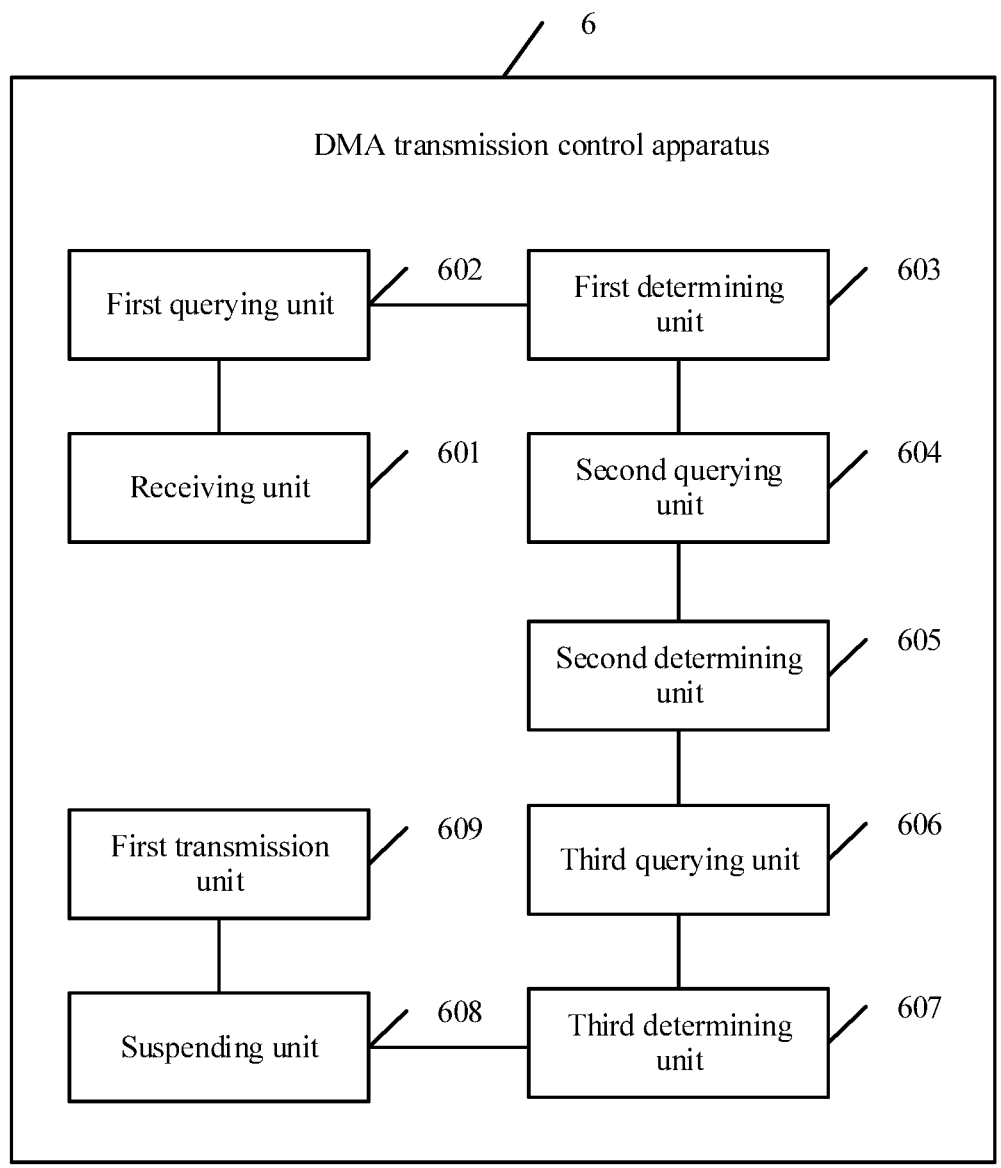
FIG. 6 is a schematic structural diagram of a DMA transmission control apparatus according to an embodiment of the present disclosure.

Referring to FIG. 6, FIG. 6 is a schematic structural diagram of a DMA transmission control apparatus 6 according to an embodiment of the present disclosure. As shown in FIG. 6, the DMA transmission control apparatus 6 in this embodiment of the present disclosure may include a receiving unit 601, a first querying unit 602, a first determining unit 603, a second querying unit 604, a second determining unit 605, a third querying unit 606, a third determining unit 607, a suspending unit 608, and a first transmission unit 609.

The receiving unit 601 is configured to receive a DMA transmission request, where the DMA transmission request carries a target DMA task.

In specific implementation, the receiving unit 601 receives the DMA transmission request, and obtains the target DMA task from the DMA transmission request, where the DMA transmission request carries the target DMA task. It can be understood that, if an external device expects to directly transmit data to a memory using a bus, the external device first sends a DMA transmission request signal to a CPU using the DMA transmission control apparatus 6, that is, the DMA transmission control apparatus 6 sends a bus control right takeover request to the CPU. When receiving the request and responding to the DMA transmission request, the CPU hands over a bus control right. In this case, the DMA transmission control apparatus 6 may process the DMA transmission request to obtain the target DMA task carried in the DMA transmission request in order to perform data transmission.

The first querying unit 602 is configured to query a priority of the target DMA task, and select, from a DMA channel according to the priority of the target DMA task, a DMA channel corresponding to the priority of the target DMA task as a target channel.

In specific implementation, the first querying unit 602 queries the priority of the target DMA task, and selects, from the DMA channel according to the priority of the target DMA task, the DMA channel corresponding to the priority of the target DMA task as the target channel. The first querying unit 602 may preset different priorities for different DMA tasks of different applications. In an optional solution, a lower priority is set for a DMA task with a larger amount of to-be-transmitted data, and a higher priority is set for a DMA task with a smaller amount of to-be-transmitted data. In this way, the DMA task with a smaller amount of to-be-transmitted data can be completed in a timely manner, thereby improving processing efficiency of a computer system. In addition, the first querying unit 602 selects, from the DMA channel according to the priority of the target DMA task, the DMA channel corresponding to the priority of the target DMA task as the target channel in order to perform data transmission on the target DMA task using the target channel.

The first determining unit 603 is configured to determine whether a channel that has been occupied by another DMA task exists in the DMA channel.

In specific implementation, the first determining unit 603 determines whether a channel that has been occupied by another DMA task exists in the DMA channel. The DMA channel includes at least one DMA channel used for data transmission. The DMA transmission control apparatus 6 determines whether there is a channel that has been occupied by another DMA task other than the target channel.

The second querying unit 604 is configured to query a task type of a DMA task that has occupied a channel and a task type of the target DMA task when a channel that has been occupied by another DMA task exists in the DMA channel.

In specific implementation, when the first determining unit 603 determines that a channel that has been occupied by another DMA task exists in the DMA channel, the second querying unit 604 queries the task type of the DMA task that has occupied the channel and the task type of the target DMA task. The task type may be classified into a bandwidth type task and a latency type task. The bandwidth type task emphasizes on an amount of data processed per unit time, and the latency type task emphasizes on a processing time spent per unit task. In a feasible solution, the task type may be classified into OLTP and OLAP. The OLTP is characterized by a small task and a small query, and a parameter for measuring performance of an OLTP system is a response time of a single task, for example, online ticket booking in an online system. The OLAP is characterized by a large task and mainly includes multi-dimensional statistics collection and analysis performed on historical data, a processing time of a task is very long, and a parameter for measuring performance of an OLAP system is a total amount of data processed per unit time. Task types of the different DMA tasks of the different applications have been recorded such that the second querying unit 604 can query a corresponding task type of a DMA task using records.

The second determining unit 605 is configured to determine whether a DMA task whose task type is different from that of the target DMA task exists in the DMA task that has occupied the channel.

In specific implementation, the second determining unit 605 determines, according to the queried task type of the DMA task that has occupied the channel and the queried task type of the target DMA task, whether a DMA task whose task type is different from that of the target DMA task exists in the DMA task that has occupied the channel.

The third querying unit 606 is configured to query a priority of the DMA task whose task type is different from that of the target DMA task when a DMA task whose task type is different from that of the target DMA task exists in the DMA task that has occupied the channel.

In specific implementation, when the second determining unit 605 determines that a DMA task whose task type is different from that of the target DMA task exists in the DMA task that has occupied the channel, the third querying unit 606 queries a priority of the DMA task whose task type is different from that of the target DMA task in order to determine a preferential DMA task processing sequence according to a task type and a priority.

The third determining unit 607 is configured to determine whether a DMA task whose priority is lower than that of the target DMA task exists in the DMA task whose task type is different from that of the target DMA task.

In specific implementation, the third determining unit 607 determines whether a DMA task whose priority is lower than that of the target DMA task exists in the DMA task whose task type is different from that of the target DMA task.

The suspending unit 608 is configured to suspend data transmission of the DMA task whose priority is lower than that of the target DMA task when a DMA task whose priority is lower than that of the target DMA task exists in the DMA task whose task type is different from that of the target DMA task.

In specific implementation, when the third determining unit 607 determines that a DMA task whose priority is lower than that of the target DMA task exists in the DMA task whose task type is different from that of the target DMA task, the suspending unit 608 suspends data transmission of the DMA task whose priority is lower than that of the target DMA task. In a feasible solution, when the DMA task whose priority is lower than that of the target DMA task is divided into multiple small tasks, even though data of some small tasks in the DMA task whose priority is lower than that of the target DMA task has been outputted using an output queue at a current moment, there is still another small task whose data is not transmitted or has been inputted using an input queue of an occupied channel. In this case, the suspending unit 608 suspends processing of the other small task, and data transmission of the target DMA task is preferentially performed.

The first transmission unit 609 is configured to obtain target data of the target DMA task, input the target data using an input queue of the target channel, and output the target data using an output queue of an occupied channel corresponding to the DMA task whose priority is lower than that of the target DMA task.

In specific implementation, after data transmission of the DMA task whose priority is lower than that of the target DMA task is suspended, the first transmission unit 609 obtains the target data of the target DMA task, inputs the target data using the input queue of the target channel, and outputs the target data using the output queue of the occupied channel corresponding to the DMA task whose priority is lower than that of the target DMA task. It can be understood that, after output of the data of the target DMA task is completed, an output signal indicating that data transmission corresponding to the target DMA task is completed is sent to the CPU such that the bus control right is returned to the CPU.

It should be noted that, the DMA transmission control apparatus 6 described in this embodiment of the present disclosure may be applied to a case in which the external device is connected to a DMA channel of the DMA transmission control apparatus 6, that is, the external device can receive the data only using an output queue of the DMA transmission channel if the external device receives data, or the external device can send the data only using an input queue of the DMA channel if the external device sends data. For example, the DMA transmission control apparatus 6 is applied to a case in which an external device A is connected to a DMA channel 1 and an external device B is also connected to the DMA channel 1. The external device A sends a transmission request of a DMA task 1, and the DMA task 1 is transmitting data of a memory to an external device. A target channel is allocated according to a priority of the DMA task 1 (the target channel is not limited to the DMA channel 1 because the data is transmitted from the memory to a DMA channel, and a channel for data input is not limited). A DMA task 2 corresponding to the external device B is being processed on the DMA channel 1. A task type of the DMA task 1 is different from a task type of the DMA task 2, and the priority of the DMA task 1 is higher than a priority of the DMA task 2. Because a same output queue is used for the DMA task 1 that needs to be preferentially processed, data transmission of the DMA task 2 is suspended, and data of the DMA task 1 is obtained. The data of the DMA task 1 is inputted using an input queue of the target channel, and the target data is outputted using an output queue of the DMA channel 1.

In this embodiment of the present disclosure, when a DMA transmission request for transmitting data of a target DMA task is received, a target channel is selected for the target DMA task according to a priority corresponding to the target DMA task. If another DMA task exists on a DMA channel, a task type and a priority of the other DMA task that has occupied the channel and a task type of the target DMA task are queried. The task type and the priority of the other DMA task that has occupied the channel are compared with the task type and the priority of the target DMA task, and data transmission on the DMA channel is controlled according to a comparison result. In this way, data transmission can be properly planned according to a priority and a task type of a DMA task, and even if there is an urgent DMA task, the urgent DMA task can be preferentially processed, thereby improving processing efficiency and service quality of a computer system.

Figure 7:
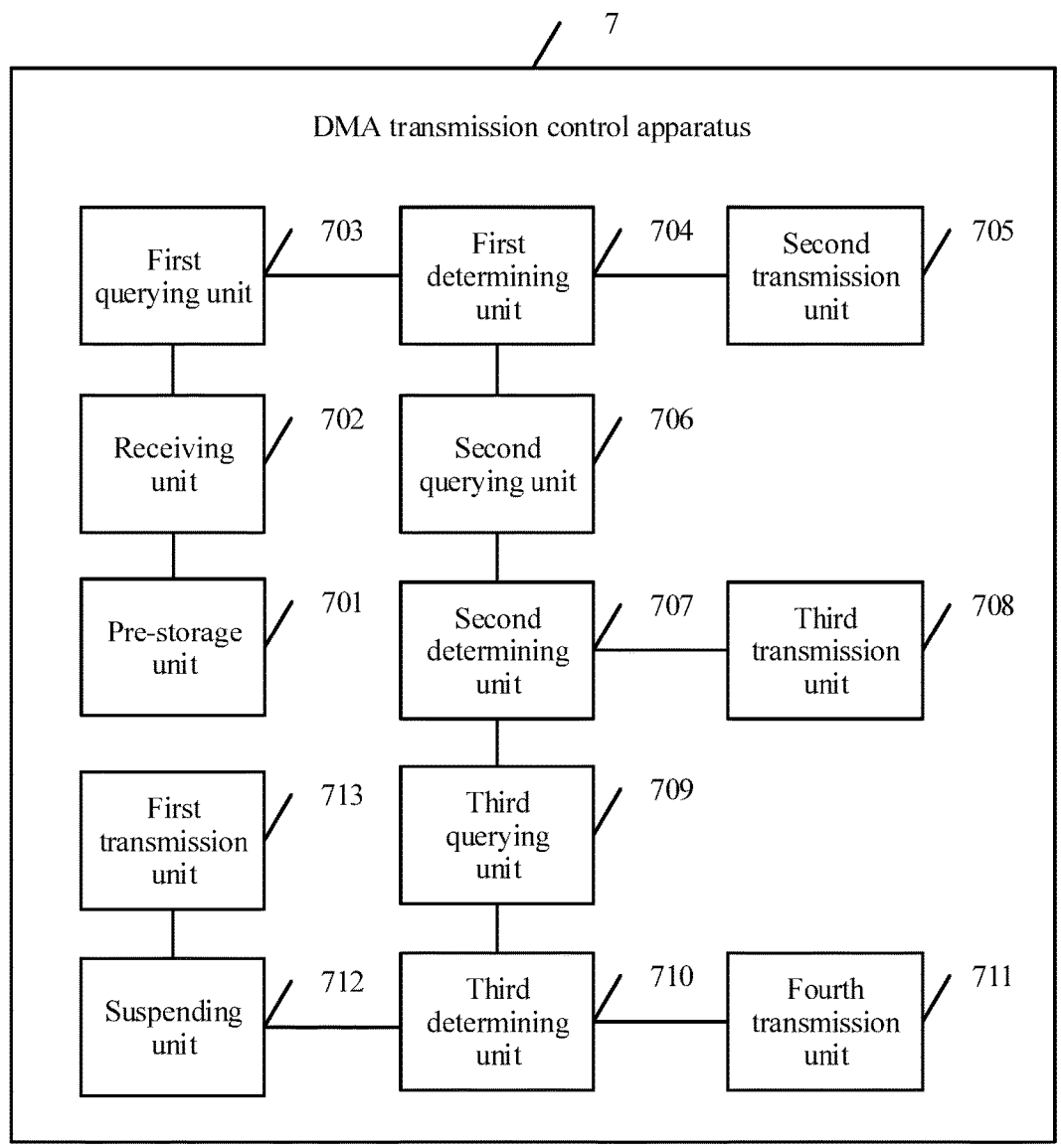
FIG. 7 is a schematic structural diagram of another DMA transmission control apparatus according to an embodiment of the present disclosure.

Referring to FIG. 7, FIG. 7 is a schematic structural diagram of a DMA transmission control apparatus 7 according to an embodiment of the present disclosure. As shown in FIG. 7, the DMA transmission control apparatus 7 in this embodiment of the present disclosure may include a pre-storage unit 701, a receiving unit 702, a first querying unit 703, a first determining unit 704, a second transmission unit 705, a second querying unit 706, a second determining unit 707, a third transmission unit 708, a third querying unit 709, a third determining unit 710, a fourth transmission unit 711, a suspending unit 712, and a first transmission unit 713.

The pre-storage unit 701 is configured to pre-store a DMA task priority list and a mapping relationship table between a DMA task priority and a DMA channel.

In specific implementation, the pre-storage unit 701 pre-stores the DMA task priority list and the mapping relationship table between a DMA task priority and a DMA channel. The DMA transmission control apparatus 7 sets different priorities for different DMA tasks and sets different priorities for different DMA channels, and may change a DMA task priority and a DMA channel priority. The DMA channel includes at least one channel used for data transmission. In an optional solution, the DMA transmission control apparatus 7 sets a priority for each channel. A DMA task priority may be determined according to an amount of to-be-transmitted data. A higher priority is set for a smaller data amount, and a lower priority is set for a larger data amount. Different priorities are determined according to data amounts, and a correspondence between a priority corresponding to a data amount and a priority that is set for a DMA channel is determined. The DMA task priority list and the mapping relationship table between a DMA task priority and a DMA channel are stored.

The receiving unit 702 is configured to receive a DMA transmission request, where the DMA transmission request carries a target DMA task.

In specific implementation, the receiving unit 702 receives the DMA transmission request, and obtains the target DMA task from the DMA transmission request, where the DMA transmission request carries the target DMA task. It can be understood that, if an external device expects to directly transmit data to a memory using a bus, the external device first sends a DMA transmission request signal to a CPU using the DMA transmission control apparatus 7, that is, the DMA transmission control apparatus 7 sends a bus control right takeover request to the CPU. When receiving the request and responding to the DMA transmission request, the CPU hands over a bus control right. In this case, the DMA transmission control apparatus 7 may process the DMA transmission request to obtain the target DMA task carried in the DMA transmission request in order to perform data transmission.

The first querying unit 703 is configured to query a priority of the target DMA task, and select, from a DMA channel according to the priority of the target DMA task, a DMA channel corresponding to the priority of the target DMA task as a target channel.

In specific implementation, the first querying unit 703 queries the priority of the target DMA task in the DMA task priority list, queries, in the mapping relationship table between a DMA task priority and a DMA channel, the DMA channel corresponding to the priority of the target DMA task, and uses the DMA channel corresponding to the priority of the target DMA task as the target channel.

The first determining unit 704 is configured to determine whether a channel that has been occupied by another DMA task exists in the DMA channel.

In specific implementation, the first determining unit 704 determines whether a channel that has been occupied by another DMA task exists in the DMA channel. The DMA channel includes at least one DMA channel used for data transmission. The first determining unit 704 determines whether there is a channel that has been occupied by another DMA task other than the target channel. If no channel that has been occupied by another DMA task exists in the DMA channel, the second transmission unit 705 performs subsequent processing, or if a channel that has been occupied by another DMA task exists in the DMA channel, the second querying unit 706 performs subsequent processing.

The second transmission unit 705 is configured to obtain target data corresponding to the target DMA task, input the target data using an input queue of the target channel, and output the target data using an output queue of the target channel when no channel that has been occupied by another DMA task exists in the DMA channel.

In specific implementation, when the first determining unit 704 determines that no channel that has been occupied by another DMA task exists in the DMA channel, the second transmission unit 705 obtains the target data corresponding to the target DMA task, inputs the target data using the input queue of the target channel, and outputs the target data using the output queue of the target channel.

The second querying unit 706 is configured to query a task type of a DMA task that has occupied a channel and a task type of the target DMA task when a channel that has been occupied by another DMA task exists in the DMA channel.

In specific implementation, when the first determining unit 704 determines that a channel that has been occupied by another DMA task exists in the DMA channel, the second querying unit 706 queries the task type of the DMA task that has occupied the channel and the task type of the target DMA task. The task type may be classified into a bandwidth type task and a latency type task. The bandwidth type task emphasizes on an amount of data processed per unit time, and the latency type task emphasizes on a processing time spent per unit task. In a feasible solution, the task type may be classified into OLTP and OLAP. The OLTP is characterized by a small task and a small query, and a parameter for measuring performance of an OLTP system is a response time of a single task, for example, online ticket booking in an online system. The OLAP is characterized by a large task and mainly includes multi-dimensional statistics collection and analysis performed on historical data, a processing time of a task is very long, and a parameter for measuring performance of an OLAP system is a total amount of data processed per unit time. Task types of different DMA tasks of different applications have been recorded such that the second querying unit 706 can query a corresponding task type of a DMA task using records.

The second determining unit 707 is configured to determine whether a DMA task whose task type is different from that of the target DMA task exists in the DMA task that has occupied the channel.

In specific implementation, the second determining unit 707 determines, according to the queried task type of the DMA task that has occupied the channel and the queried task type of the target DMA task, whether a DMA task whose task type is different from that of the target DMA task exists in the DMA task that has occupied the channel. If no DMA task whose task type is different from that of the target DMA task exists in the DMA task that has occupied the channel, the third transmission unit 708 performs subsequent processing, or if a DMA task whose task type is different from that of the target DMA task exists in the DMA task that has occupied the channel, the third querying unit 709 performs subsequent processing.

The third transmission unit 708 is configured to obtain target data corresponding to the target DMA task, input the target data using an input queue of the target channel, and output the target data using an output queue of the target channel when no DMA task whose task type is different from that of the target DMA task exists in the DMA task that has occupied the channel.

In specific implementation, when the second determining unit 707 determines that no DMA task whose task type is different from that of the target DMA task exists in the DMA task that has occupied the channel, the third transmission unit 708 obtains the target data corresponding to the target DMA task, inputs the target data using the input queue of the target channel, and outputs the target data using the output queue of the target channel.

The third querying unit 709 is configured to query a priority of the DMA task whose task type is different from that of the target DMA task when a DMA task whose task type is different from that of the target DMA task exists in the DMA task that has occupied the channel.

In specific implementation, when the second determining unit 707 determines that a DMA task whose task type is different from that of the target DMA task exists in the DMA task that has occupied the channel, the third querying unit 709 queries a priority of the DMA task whose task type is different from that of the target DMA task in order to determine a preferential DMA task processing sequence according to a task type and a priority.

The third determining unit 710 is configured to determine whether a DMA task whose priority is lower than that of the target DMA task exists in the DMA task whose task type is different from that of the target DMA task.

In specific implementation, the third determining unit 710 determines whether a DMA task whose priority is lower than that of the target DMA task exists in the DMA task whose task type is different from that of the target DMA task. If no DMA task whose priority is lower than that of the target DMA task exists in the DMA task whose task type is different from that of the target DMA task, the fourth transmission unit 711 performs subsequent processing, or if a DMA task whose priority is lower than that of the target DMA task exists in the DMA task whose task type is different from that of the target DMA task, the suspending unit 712 performs subsequent processing.

The fourth transmission unit 711 is configured to obtain target data corresponding to the target DMA task, input the target data using an input queue of the target channel, and output the target data using an output queue of the target channel when no DMA task whose priority is lower than that of the target DMA task exists in the DMA task whose task type is different from that of the target DMA task.

In specific implementation, when the third determining unit 710 determines that no DMA task whose priority is lower than that of the target DMA task exists in the DMA task whose task type is different from that of the target DMA task, the fourth transmission unit 711 obtains the target data corresponding to the target DMA task, inputs the target data using the input queue of the target channel, and outputs the target data using the output queue of the target channel.

The suspending unit 712 is configured to suspend data transmission of the DMA task whose priority is lower than that of the target DMA task when a DMA task whose priority is lower than that of the target DMA task exists in the DMA task whose task type is different from that of the target DMA task.

In specific implementation, when a DMA task whose priority is lower than that of the target DMA task exists in the DMA task whose task type is different from that of the target DMA task, the suspending unit 712 suspends data transmission of the DMA task whose priority is lower than that of the target DMA task. In a feasible solution, when the DMA task whose priority is lower than that of the target DMA task is divided into multiple small tasks, even though data of some small tasks in the DMA task whose priority is lower than that of the target DMA task has been outputted using the output queue at a current moment, there is still another small task whose data is not transmitted or has been inputted using an input queue of an occupied channel. In this case, processing of the other small task is suspended, and data transmission of the target DMA task is preferentially performed.

The first transmission unit 713 is configured to obtain target data of the target DMA task, input the target data using an input queue of the target channel, and output the target data using an output queue of an occupied channel corresponding to the DMA task whose priority is lower than that of the target DMA task.

In specific implementation, after data transmission of the DMA task whose priority is lower than that of the target DMA task is suspended, the first transmission unit 713 obtains the target data of the target DMA task, inputs the target data using the input queue of the target channel, and outputs the target data using the output queue of the occupied channel corresponding to the DMA task whose priority is lower than that of the target DMA task. It can be understood that, after output of the data of the target DMA task is completed, an output signal indicating that data transmission corresponding to the target DMA task is completed is sent to the CPU such that the bus control right is returned to the CPU.

It should be noted that, the DMA transmission control apparatus 7 described in this embodiment of the present disclosure may be applied to a case in which the external device is connected to a DMA channel of the DMA transmission control apparatus 7, that is, if the external device receives data, the external device can receive the data only using an output queue of the DMA transmission channel, or if the external device sends data, the external device can send the data only using an input queue of the DMA channel. For example, the DMA transmission control apparatus 7 is applied to a case in which an external device A is connected to a DMA channel 1 and an external device B is also connected to the DMA channel 1. The external device A sends a transmission request of a DMA task 1, and the DMA task 1 is transmitting data of a memory to an external device. A target channel is allocated according to a priority of the DMA task 1 (the target channel is not limited to the DMA channel 1 because the data is transmitted from the memory to a DMA channel, and a channel for data input is not limited). A DMA task 2 corresponding to the external device B is being processed on the DMA channel 1. A task type of the DMA task 1 is different from a task type of the DMA task 2, and the priority of the DMA task 1 is higher than a priority of the DMA task 2. Because a same output queue is used for the DMA task 1 that needs to be preferentially processed, data transmission of the DMA task 2 is suspended, and data of the DMA task 1 is obtained. The data of the DMA task 1 is inputted using an input queue of the target channel, and the target data is outputted using the output queue of the DMA channel 1.

In this embodiment of the present disclosure, when a DMA transmission request for transmitting data of a target DMA task is received, a target channel is selected for the target DMA task according to a priority corresponding to the target DMA task, if another DMA task exists on a DMA channel, a task type and a priority of the other DMA task that has occupied the channel and a task type of the target DMA task are queried, the task type and the priority of the other DMA task that has occupied the channel are compared with the task type and the priority of the target DMA task, and data transmission on the DMA channel is controlled according to a comparison result. In this way, data transmission can be properly planned according to a priority and a task type of a DMA task, and even if there is an urgent DMA task, the urgent DMA task can be preferentially processed, thereby improving processing efficiency and service quality of a computer system.

Figure 8:
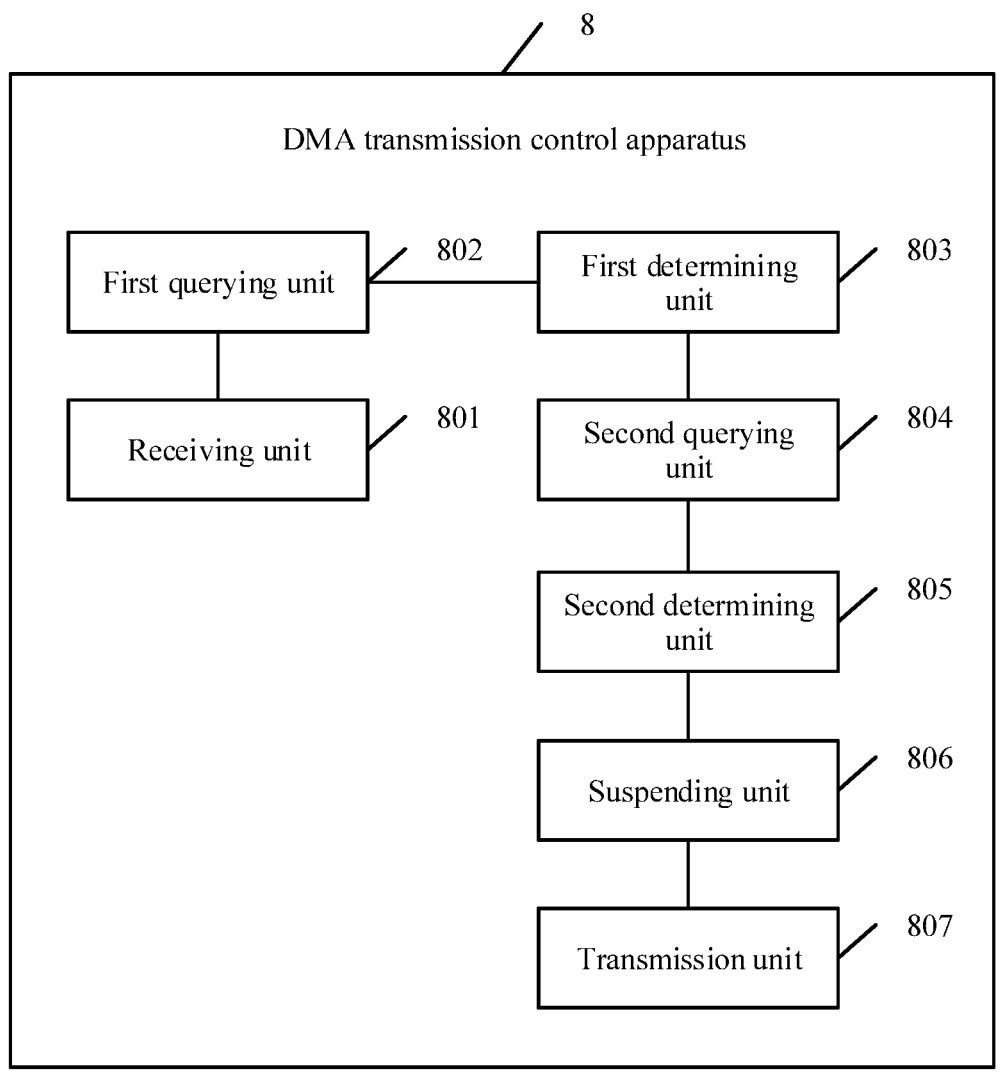
FIG. 8 is a schematic structural diagram of still another DMA transmission control apparatus according to an embodiment of the present disclosure.

Referring to FIG. 8, FIG. 8 is a schematic structural diagram of a DMA transmission control apparatus 8 according to an embodiment of the present disclosure. As shown in FIG. 8, the DMA transmission control apparatus 8 in this embodiment of the present disclosure may include a receiving unit 801, a first querying unit 802, a first determining unit 803, a second querying unit 804, a second determining unit 805, a suspending unit 806, and a transmission unit 807.

The receiving unit 801 is configured to receive a DMA transmission request, where the DMA transmission request carries a target DMA task.

In specific implementation, the receiving unit 801 receives the DMA transmission request, and obtains the target DMA task from the DMA transmission request, where the DMA transmission request carries the target DMA task.

It can be understood that, if an external device expects to directly transmit data to a memory using a bus, the external device first sends a DMA transmission request signal to a CPU using the DMA transmission control apparatus 8, that is, the DMA transmission control apparatus 8 sends a bus control right takeover request to the CPU. When receiving the request and responding to the DMA transmission request, the CPU hands over a bus control right. In this case, the DMA transmission control apparatus 8 may process the DMA transmission request to obtain the target DMA task carried in the DMA transmission request in order to perform data transmission.

The first querying unit 802 is configured to query a priority of the target DMA task, and select, from a DMA channel according to the priority of the target DMA task, a DMA channel corresponding to the priority of the target DMA task as a target channel.

In specific implementation, the first querying unit 802 queries the priority of the target DMA task, and selects, from the DMA channel according to the priority of the target DMA task, the DMA channel corresponding to the priority of the target DMA task as the target channel. Different priorities may be preset for different DMA tasks of different applications. In an optional solution, a lower priority is set for a DMA task with a larger amount of to-be-transmitted data, and a higher priority is set for a DMA task with a smaller amount of to-be-transmitted data. In this way, the DMA task with a smaller amount of to-be-transmitted data can be completed in a timely manner, thereby improving processing efficiency of a computer system. In addition, the DMA transmission control apparatus 8 selects, from the DMA channel according to the priority of the target DMA task, the DMA channel corresponding to the priority of the target DMA task as the target channel in order to perform data transmission on the target DMA task using the target channel.

The first determining unit 803 is configured to determine whether a channel that has been occupied by another DMA task exists in the DMA channel.

In specific implementation, the first determining unit 803 determines whether a channel that has been occupied by another DMA task exists in the DMA channel. The DMA channel includes at least one DMA channel used for data transmission. The DMA transmission control apparatus 8 determines whether there is a channel that has been occupied by another DMA task other than the target channel.

The second querying unit 804 is configured to query a priority of a DMA task that has occupied a channel when a channel that has been occupied by another DMA task exists in the DMA channel.

In specific implementation, when the first determining unit 803 determines that a channel that has been occupied by another DMA task exists in the DMA channel, the second querying unit 804 queries the priority of the DMA task that has occupied the channel in order to determine a DMA task processing sequence according to a priority.

The second determining unit 805 is configured to determine whether a DMA task whose priority is lower than that of the target DMA task exists in the DMA task that has occupied the channel.

In specific implementation, the second determining unit 805 determines whether a DMA task whose priority is lower than that of the target DMA task exists in the DMA task that has occupied the channel.

The suspending unit 806 is configured to suspend data transmission of the DMA task whose priority is lower than that of the target DMA task when a DMA task whose priority is lower than that of the target DMA task exists in the DMA task that has occupied the channel.

In specific implementation, when the second determining unit 805 determines that a DMA task whose priority is lower than that of the target DMA task exists in the DMA task that has occupied the channel, the suspending unit 806 suspends data transmission of the DMA task whose priority is lower than that of the target DMA task. In a feasible solution, when the DMA task whose priority is lower than that of the target DMA task is divided into multiple small tasks, even though data of some small tasks in the DMA task whose priority is lower than that of the target DMA task has been outputted using an output queue at a current moment, there is still another small task whose data is not transmitted or has been inputted using an input queue of an occupied channel. In this case, the suspending unit 806 suspends processing of the other small task, and data transmission of the target DMA task is preferentially performed.

The transmission unit 807 is configured to obtain target data of the target DMA task, input the target data using an input queue of the target channel, and output the target data using an output queue of an occupied channel corresponding to the DMA task whose priority is lower than that of the target DMA task.

In specific implementation, the transmission unit 807 obtains the target data of the target DMA task, inputs the target data using the input queue of the target channel, and outputs the target data using the output queue of the occupied channel corresponding to the DMA task whose priority is lower than that of the target DMA task. It can be understood that, after output of the data of the target DMA task is completed, an output signal indicating that data transmission corresponding to the target DMA task is completed is sent to the CPU such that the bus control right is returned to the CPU.

It should be noted that, the DMA transmission control apparatus 8 described in this embodiment of the present disclosure may be applied to a case in which the external device is connected to a DMA channel of the DMA transmission control apparatus 8, that is, if the external device receives data, the external device can receive the data only using an output queue of the DMA transmission channel, or if the external device sends data, the external device can send the data only using an input queue of the DMA channel. For example, the DMA transmission control apparatus 8 is applied to a case in which an external device A is connected to a DMA channel 1 and an external device B is also connected to the DMA channel 1. The external device A sends a transmission request of a DMA task 1, and the DMA task 1 is transmitting data of a memory to an external device. A target channel is allocated according to a priority of the DMA task 1 (the target channel is not limited to the DMA channel 1 because the data is transmitted from the memory to a DMA channel, and a channel for data input is not limited). A DMA task 2 corresponding to the external device B is being processed on the DMA channel 1, and the priority of the DMA task 1 is higher than a priority of the DMA task 2. Because a same output queue is used for the DMA task 1 that needs to be preferentially processed, data transmission of the DMA task 2 is suspended, and data of the DMA task 1 is obtained. The data of the DMA task 1 is inputted using an input queue of the target channel, and the target data is outputted using the output queue of the DMA channel 1.

In this embodiment of the present disclosure, when a DMA transmission request for transmitting data of a target DMA task is received, a target channel is selected for the target DMA task according to a priority corresponding to the target DMA task. If another DMA task exists on a DMA channel, a priority of the other DMA task that has occupied the channel is queried. The priority of the other DMA task that has occupied the channel is compared with the priority of the target DMA task, and data transmission on the DMA channel is controlled according to a comparison result. In this way, data transmission can be properly planned according to a priority of a DMA task, and even if there is an urgent DMA task, the urgent DMA task can be preferentially processed, thereby improving processing efficiency and service quality of a computer system.

Figure 9:
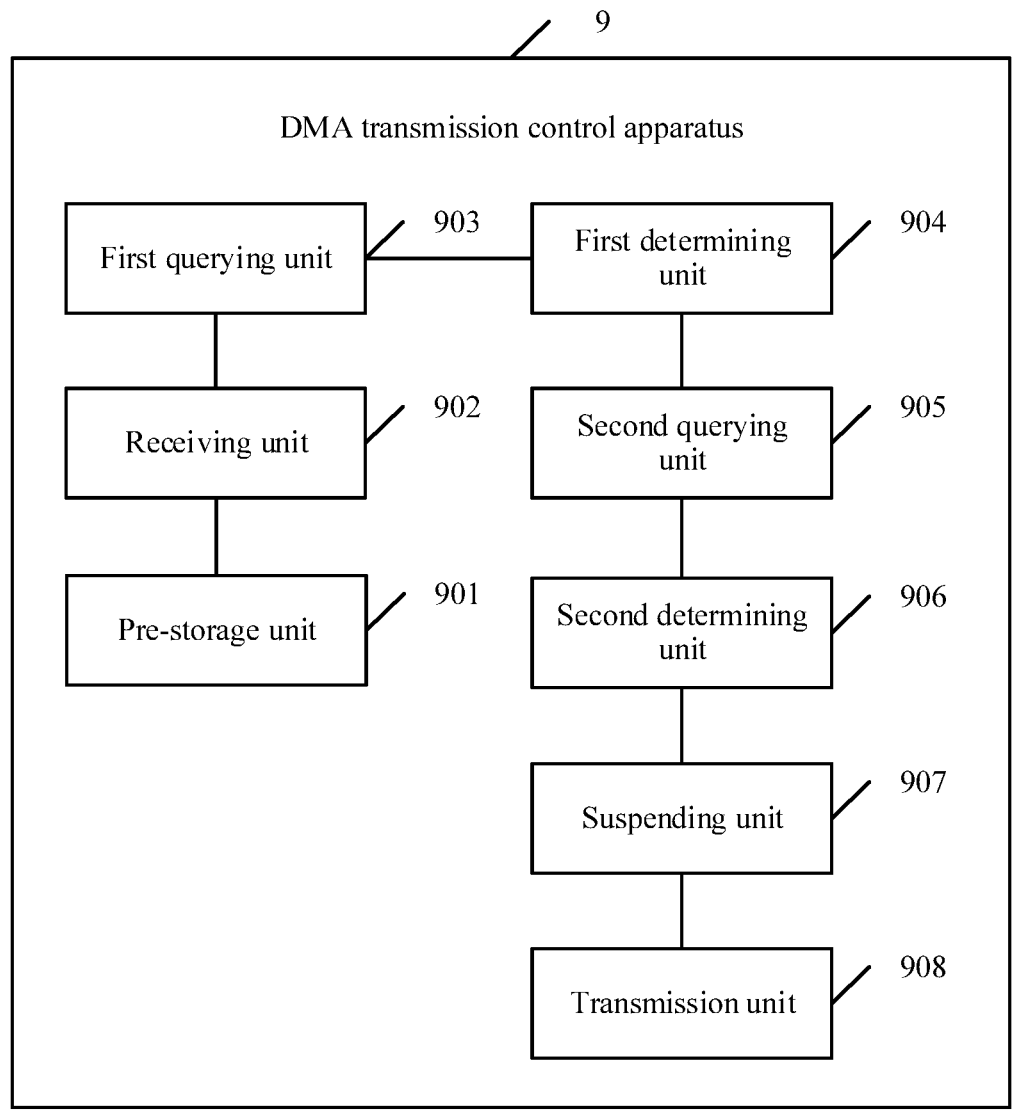
FIG. 9 is a schematic structural diagram of still another DMA transmission control apparatus according to an embodiment of the present disclosure.

Referring to FIG. 9, FIG. 9 is a schematic structural diagram of a DMA transmission control apparatus 9 according to an embodiment of the present disclosure. As shown in FIG. 9, the DMA transmission control apparatus 9 in this embodiment of the present disclosure may include a pre-storage unit 901, a receiving unit 902, a first querying unit 903, a first determining unit 904, a second querying unit 905, a second determining unit 906, a suspending unit 907, and a transmission unit 908.

The pre-storage unit 901 is configured to pre-store a DMA task priority list and a mapping relationship table between a DMA task priority and a DMA channel.

In specific implementation, the pre-storage unit 901 pre-stores the DMA task priority list and the mapping relationship table between a DMA task priority and a DMA channel. The DMA transmission control apparatus 9 sets different priorities for different DMA tasks and sets different priorities for different DMA channels, and may change a DMA task priority and a DMA channel priority. The DMA channel includes at least one channel used for data transmission. In an optional solution, the DMA transmission control apparatus 9 sets a priority for each channel. A DMA task priority may be determined according to an amount of to-be-transmitted data. A higher priority is set for a smaller data amount, and a lower priority is set for a larger data amount. Different priorities are determined according to data amounts, and a correspondence between a priority corresponding to a data amount and a priority that is set for a DMA channel is determined. The DMA task priority list and the mapping relationship table between a DMA task priority and a DMA channel are stored.

The receiving unit 902 is configured to receive a DMA transmission request, where the DMA transmission request carries a target DMA task.

In specific implementation, the receiving unit 902 receives the DMA transmission request, and obtains the target DMA task from the DMA transmission request, where the DMA transmission request carries the target DMA task. It can be understood that, if an external device expects to directly transmit data to a memory using a bus, the external device first sends a DMA transmission request signal to a CPU using the DMA transmission control apparatus 9, that is, the DMA transmission control apparatus 9 sends a bus control right takeover request to the CPU. When receiving the request and responding to the DMA transmission request, the CPU hands over a bus control right. In this case, the DMA transmission control apparatus 9 may process the DMA transmission request to obtain the target DMA task carried in the DMA transmission request in order to perform data transmission.

The first querying unit 903 is configured to query a priority of the target DMA task, and select, from a DMA channel according to the priority of the target DMA task, a DMA channel corresponding to the priority of the target DMA task as a target channel.

In specific implementation, the first querying unit 903 queries the priority of the target DMA task in the DMA task priority list, queries, in the mapping relationship table between a DMA task priority and a DMA channel, the DMA channel corresponding to the priority of the target DMA task, and uses the DMA channel corresponding to the priority of the target DMA task as the target channel.

The first determining unit 904 is configured to determine whether a channel that has been occupied by another DMA task exists in the DMA channel.

In specific implementation, the first determining unit 904 determines whether a channel that has been occupied by another DMA task exists in the DMA channel. The DMA channel includes at least one DMA channel used for data transmission. The first determining unit 904 determines whether there is a channel that has been occupied by another DMA task other than the target channel.

The second querying unit 905 is configured to query a priority of a DMA task that has occupied a channel when a channel that has been occupied by another DMA task exists in the DMA channel.

In specific implementation, when the first determining unit 904 determines that a channel that has been occupied by another DMA task exists in the DMA channel, the second querying unit 905 queries the priority of the DMA task that has occupied the channel in order to determine a DMA task processing sequence according to a priority.

The second determining unit 906 is configured to determine whether a DMA task whose priority is lower than that of the target DMA task exists in the DMA task that has occupied the channel.

In specific implementation, the second determining unit 906 determines whether a DMA task whose priority is lower than that of the target DMA task exists in the DMA task that has occupied the channel.

The suspending unit 907 is configured to suspend data transmission of the DMA task whose priority is lower than that of the target DMA task when a DMA task whose priority is lower than that of the target DMA task exists in the DMA task that has occupied the channel.

In specific implementation, when the second determining unit 906 determines that a DMA task whose priority is lower than that of the target DMA task exists in the DMA task that has occupied the channel, the suspending unit 907 suspends data transmission of the DMA task whose priority is lower than that of the target DMA task. In a feasible solution, when the DMA task whose priority is lower than that of the target DMA task is divided into multiple small tasks, even though data of some small tasks in the DMA task whose priority is lower than that of the target DMA task has been outputted using an output queue at a current moment, there is still another small task whose data is not transmitted or has been inputted using an input queue of an occupied channel. In this case, the suspending unit 907 suspends processing of the other small task, and data transmission of the target DMA task is preferentially performed.

The transmission unit 908 is configured to obtain target data of the target DMA task, input the target data using an input queue of the target channel, and output the target data using an output queue of an occupied channel corresponding to the DMA task whose priority is lower than that of the target DMA task.

In specific implementation, the transmission unit 908 obtains the target data of the target DMA task, inputs the target data using the input queue of the target channel, and outputs the target data using the output queue of the occupied channel corresponding to the DMA task whose priority is lower than that of the target DMA task. It can be understood that, after output of the data of the target DMA task is completed, an output signal indicating that data transmission corresponding to the target DMA task is completed is sent to the CPU such that the bus control right is returned to the CPU.

Further, in a feasible solution, when the first determining unit 904 determines that no channel that has been occupied by another DMA task exists in the DMA channel, target data corresponding to the target DMA task is obtained, the target data is inputted using an input queue of the target channel, and the target data is outputted using an output queue of the target channel. In another feasible solution, when the second determining unit 906 determines that no DMA task whose priority is lower than that of the target DMA task exists in the DMA task that has occupied the channel, target data corresponding to the target DMA task is obtained, the target data is inputted using an input queue of the target channel, and the target data is outputted using an output queue of the target channel.

It should be noted that, the DMA transmission control apparatus 9 described in this embodiment of the present disclosure may be applied to a case in which the external device is connected to a DMA channel of the DMA transmission control apparatus 9, that is, if the external device receives data, the external device can receive the data only using an output queue of the DMA transmission channel, or if the external device sends data, the external device can send the data only using an input queue of the DMA channel. For example, the DMA transmission control apparatus 9 is applied to a case in which an external device A is connected to a DMA channel 1 and an external device B is also connected to the DMA channel 1. The external device A sends a transmission request of a DMA task 1, and the DMA task 1 is transmitting data of a memory to an external device. A target channel is allocated according to a priority of the DMA task 1 (the target channel is not limited to the DMA channel 1 because the data is transmitted from the memory to a DMA channel, and a channel for data input is not limited). A DMA task 2 corresponding to the external device B is being processed on the DMA channel 1, and the priority of the DMA task 1 is higher than a priority of the DMA task 2. Because a same output queue is used for the DMA task 1 that needs to be preferentially processed, data transmission of the DMA task 2 is suspended, and data of the DMA task 1 is obtained. The data of the DMA task 1 is inputted using an input queue of the target channel, and the target data is outputted using an output queue of the DMA channel 1.

In this embodiment of the present disclosure, when a DMA transmission request for transmitting data of a target DMA task is received, a target channel is selected for the target DMA task according to a priority corresponding to the target DMA task, if another DMA task exists on a DMA channel, a priority of the other DMA task that has occupied the channel is queried, the priority of the other DMA task that has occupied the channel is compared with the priority of the target DMA task, and data transmission on the DMA channel is controlled according to a comparison result. In this way, data transmission can be properly planned according to a priority of a DMA task, and even if there is an urgent DMA task, the urgent DMA task can be preferentially processed, thereby improving processing efficiency and service quality of a computer system.

An embodiment of the present disclosure further provides a computer storage medium. The computer storage medium may store a program, and when the program is executed, a part or all of steps of any DMA transmission control method described in the foregoing method embodiments are performed.

In the foregoing embodiments, the description of each embodiment has respective focuses. For a part that is not described in detail in an embodiment, refer to related descriptions in other embodiments.

It should be noted that, for ease of description, the foregoing method embodiments are expressed as a series of actions. However, persons skilled in the art should appreciate that the present disclosure is not limited to the described action sequence, because according to the present disclosure, some steps may be performed in another sequence or performed simultaneously. In addition, persons skilled in the art should also appreciate that all the embodiments described in the specification are examples of embodiments, and the related actions and modules are not necessarily mandatory to the present disclosure.

In the several embodiments provided in this application, it should be understood that the disclosed apparatus may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present disclosure essentially, or the part contributing to other approaches, or all or a part of the technical solutions may be implemented in a form of a software product. The software product is stored in a storage medium and includes several instructions for instructing a computer device (which may be a personal computer, a server, or a network device, and may further be a processor in a computer device) to perform all or a part of the steps of the foregoing methods described in the embodiments of the present disclosure. The storage medium includes any medium that can store program code, such as a universal serial bus (USB) flash drive, a removable hard disk, a magnetic disk, an optical disc, a read-only memory (ROM), or a random access memory (RAM).

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A direct memory access (DMA) transmission control method, applied to a DMA transmission control apparatus to control data transmission on a DMA channel, data transmitted on the DMA channel comprising data transmitted between an external device and a memory, and the method comprising:
    receiving a DMA transmission request carrying a target DMA task;
    querying a priority of the target DMA task, the priority of the target DMA task being based on an amount of to-be-transmitted data, a lower priority being set for the target DMA task when the target DMA task comprises a smaller amount of to-be-transmitted data, and a higher priority being set for the target DMA task when the target DMA task comprises a larger amount of to-be-transmitted data;
    selecting, from a DMA channel block according to the priority of the target DMA task, a DMA channel corresponding to the priority of the target DMA task as a target channel;
    querying a task type of a DMA task that has occupied the DMA channel and a task type of the target DMA task when the DMA channel that has been occupied by the DMA task exists in the DMA channel block;
    querying a priority of a DMA task whose task type is different from that of the target DMA task when the DMA task whose task type is different from that of the target DMA task exists in the DMA task that has occupied the DMA channel; and
    suspending data transmission of a DMA task whose priority is lower than that of the target DMA task, obtaining target data of the target DMA task, inputting the target data using an input queue of the target channel, and outputting the target data using an output queue of an occupied channel corresponding to the DMA task whose priority is lower than that of the target DMA task when the DMA task whose priority is lower than that of the target DMA task exists in the DMA task whose task type is different from that of the target DMA task.

2. The method of claim 1, wherein before receiving the DMA transmission request, the method further comprises pre-storing a DMA task priority list and a mapping relationship table between a DMA task priority and a DMA channel, and querying the priority of the target DMA task and selecting the target channel comprising:
    querying the priority of the target DMA task in the DMA task priority list;
    querying, in the mapping relationship table, the DMA channel corresponding to the priority of the target DMA task; and
    setting the DMA channel corresponding to the priority of the target DMA task as the target channel.

3. The method of claim 1, wherein when no DMA channel that has been occupied by the DMA task exists in the DMA channel block, the method further comprises:
    obtaining the target data corresponding to the target DMA task;
    inputting the target data using the input queue of the target channel; and outputting the target data using an output queue of the target channel.

4. The method of claim 1, wherein when no DMA task whose task type is different from that of the target DMA task exists in the DMA task that has occupied the DMA channel, the method further comprises:
   obtaining the target data corresponding to the target DMA task;
   inputting the target data using the input queue of the target channel; and
   outputting the target data using an output queue of the target channel.

5. The method of claim 1, wherein when no DMA task whose priority is lower than that of the target DMA task exists in the DMA task whose task type is different from that of the target DMA task, the method further comprises:
   obtaining the target data corresponding to the target DMA task;
   inputting the target data using the input queue of the target channel; and
   outputting the target data using an output queue of the target channel.

6. A direct memory access (DMA) transmission control method, applied to a DMA transmission control apparatus to control data transmission on a DMA channel, data transmitted on the DMA channel comprising data transmitted between an external device and a memory, and the method comprising:
   receiving a DMA transmission request carrying a target DMA task;
   querying a priority of the target DMA task, the priority of the target DMA task being based on an amount of to-be-transmitted data, a lower priority being set for the target DMA task when the target DMA task comprises a smaller amount of to-be-transmitted data, and a higher priority being set for the target DMA task when the target DMA task comprises a larger amount of to-be-transmitted data;
   selecting, from a DMA channel block according to the priority of the target DMA task, a DMA channel corresponding to the priority of the target DMA task as a target channel;
   querying a priority of a DMA task that has occupied the DMA channel when the DMA channel that has been occupied by the DMA task exists in the DMA channel block; and
   suspending data transmission of a DMA task whose priority is lower than that of the target DMA task, obtaining target data of the target DMA task, inputting the target data using an input queue of the target channel, and outputting the target data using an output queue of an occupied channel corresponding to the DMA task whose priority is lower than that of the target DMA task when the DMA task whose priority is lower than that of the target DMA task exists in the DMA task that has occupied the DMA channel.

7. The method of claim 6, wherein before receiving the DMA transmission request, the method further comprises pre-storing a DMA task priority list and a mapping relationship table between a DMA task priority and a DMA channel, and querying the priority of the target DMA task and selecting the target channel comprises:
   querying the priority of the target DMA task in the DMA task priority list;
   querying, in the mapping relationship table, the DMA channel corresponding to the priority of the target DMA task; and
   setting the DMA channel corresponding to the priority of the target DMA task as the target channel.

8. A direct memory access (DMA) transmission control apparatus to control data transmission on a DMA channel, data transmitted on the DMA channel comprising data transmitted between an external device and a memory, and the apparatus comprising:
   a receiver configured to receive a DMA transmission request carrying a target DMA task;
   a processor coupled to the receiver and configured to:
      query a priority of the target DMA task, the priority of the target DMA task being based on an amount of to-be-transmitted data, a lower priority being set for the target DMA task when the target DMA task comprises a smaller amount of to-be-transmitted data, and a higher priority being set for the target DMA task when the tart DMA task comprises a larger amount of to-be-transmitted data;
      select, from a DMA channel block according to the priority of the target DMA task, a DMA channel corresponding to the priority of the target DMA task as a target channel;
      query a task type of a DMA task that has occupied the DMA channel and a task type of the target DMA task when the DMA channel that has been occupied by the DMA task exists in the DMA channel block;
      query a priority of a DMA task whose task type is different from that of the target DMA task when the DMA task whose task type is different from that of the target DMA task exists in the DMA task that has occupied the DMA channel;
      suspend data transmission of a DMA task whose priority is lower than that of the target DMA task when the DMA task whose priority is lower than that of the target DMA task exists in the DMA task whose task type is different from that of the target DMA task; and
   a transmitter coupled to the processor and configured to:
      obtain target data of the target DMA task;
      input the target data using an input queue of the target channel; and
      output the target data using an output queue of an occupied channel corresponding to the DMA task whose priority is lower than that of the target DMA task.

9. The apparatus of claim 8, further comprising pre-storage circuitry coupled to the receiver, the processor, and the transmitter and configured to pre-store a DMA task priority list and a mapping relationship table between a DMA task priority and a DMA channel, and the processor being further configured to:
   query the priority of the target DMA task in the DMA task priority list;
   query, in the mapping relationship table, the DMA channel corresponding to the priority of the target DMA task; and
   set the DMA channel corresponding to the priority of the target DMA task as the target channel.

10. The apparatus of claim 8, wherein when no DMA channel that has been occupied by the DMA task exists in the DMA channel block, the transmitter is further configured to:
   obtain the target data corresponding to the target DMA task;
   input the target data using the input queue of the target channel; and output the target data using an output queue of the target channel.

11. The apparatus of claim 8, wherein when no DMA task whose task type is different from that of the target DMA task exists in the DMA task that has occupied the DMA channel, the transmitter is further configured to:
- obtain the target data corresponding to the target DMA task;
- input the target data using the input queue of the target channel; and
- output the target data using an output queue of the target channel.

12. The apparatus of claim 8, wherein when no DMA task whose priority is lower than that of the target DMA task exists in the DMA task whose task type is different from that of the target DMA task, the transmitter is further configured to:
- obtain the target data corresponding to the target DMA task;
- input the target data using the input queue of the target channel; and
- output the target data using an output queue of the target channel.

13. A direct memory access (DMA) transmission control apparatus to control data transmission on a DMA channel, data transmitted on the DMA channel comprising data transmitted between an external device and a memory, and the apparatus comprising:
- a receiver configured to receive a DMA transmission request carrying a target DMA task;
- a processor coupled to the receiver and configured to:
  - query a priority of the target DMA task, the priority of the target DMA task being based on an amount of to-be-transmitted data, a lower priority being set for the target DMA task when the target DMA task comprises a smaller amount of to-be-transmitted data, and a higher priority being set for the target DMA task when the target DMA task comprises a larger amount of to-be-transmitted data;
  - select, from a DMA channel block according to the priority of the target DMA task, a DMA channel corresponding to the priority of the target DMA task as a target channel;
  - query a priority of a DMA task that has occupied the DMA channel when the DMA channel that has been occupied by the DMA task exists in the DMA channel block; and
  - suspend data transmission of a DMA task Whose priority is lower than that of the target DMA task when the DMA task whose priority is lower than that of the target DMA task exists in the DMA task that has occupied the DMA channel; and
- a transmitter coupled to the processor and configured to:
  - obtain target data of the target DMA task;
  - input the target data using an input queue of the target channel; and
  - output the target data using an output queue of an occupied channel corresponding to the DMA task whose priority is lower than that of the target DMA task.

14. The apparatus of claim 13, further comprising pre-storage circuitry coupled to the receiver, the processor, and the transmitter and configured to pre-store a DMA task priority list and a mapping relationship table between a DMA task priority and a DMA channel, and the processor being further configured to:
- query the priority of the target DMA task in the DMA task priority list;
- query, in the mapping relationship table, the DMA channel corresponding to the priority of the target DMA task; and
- set the DMA channel corresponding to the priority of the target DMA task as the target channel.

15. The method of claim 1, wherein the priority of the target DMA task is further based on a type of application associated with the target DMA task.

16. The method of claim 15, wherein the type of the DMA task comprises either an online transaction processing (OLTP) type application or an online analytical processing (OLAP) type application.

17. The method of claim 1, wherein the DMA transmission control apparatus determines a preferential DMA processing sequence according to a the task type of the DMA task and the priority of the DMA task.

18. The method of claim 6, wherein the priority of the target DMA task is further based on a type of application associated with the target DMA task, the type of the DMA task comprising either an online transaction processing (OLTP) type application or an online analytical processing (OLAP) type application, and the DMA transmission control apparatus determining a preferential DMA processing sequence.

19. The apparatus of claim 8, wherein the priority of the target DMA task is further based on a type of application associated with the target DMA task, the type of the DMA task comprising either an online transaction processing (OLTP) type application or an online analytical processing (OLAP) type application, and the DMA transmission control apparatus determining a preferential DMA processing sequence.

20. The apparatus of claim 13, wherein the priority of the target DMA task is further based on a type of application associated with the target DMA task, the type of the DMA task comprising either an online transaction processing (OLTP) type application or an online analytical processing (OLAP) type application, and the DMA transmission control apparatus determining a preferential DMA processing sequence.

* * * * *